United States Patent [19]

Patel

[11] 4,201,976
[45] May 6, 1980

[54] PLURAL CHANNEL ERROR CORRECTING METHODS AND MEANS USING ADAPTIVE REALLOCATION OF REDUNDANT CHANNELS AMONG GROUPS OF CHANNELS

[75] Inventor: Arvind M. Patel, San Jose, Calif.

[73] Assignee: International Business Machines Corporation, Armonk, N.Y.

[21] Appl. No.: 863,653

[22] Filed: Dec. 23, 1977

[51] Int. Cl.² .............................................. G06F 11/12
[52] U.S. Cl. ..................................................... 371/50
[58] Field of Search ............. 340/146.1 AL, 146.1 AV

[56] References Cited

U.S. PATENT DOCUMENTS

| | | | |
|---|---|---|---|
| 3,639,900 | 1/1972 | Hinz, Jr. ...................... | 340/146.1 AL |
| 3,745,526 | 7/1973 | Hong et al. .................. | 340/146.1 AL |
| 3,745,528 | 7/1973 | Patel ............................ | 340/146.1 AL |
| 3,800,281 | 3/1974 | Devore et al. ............... | 340/146.1 AL |
| 3,851,306 | 11/1974 | Patel ........................... | 340/146.1 AL |
| 3,868,632 | 2/1975 | Hong et al. .................. | 340/146.1 AL |
| 3,893,070 | 7/1975 | Bossen et al. ............... | 340/146.1 AL |
| 3,958,220 | 5/1976 | Marshall ..................... | 340/146.1 AL |
| 4,052,698 | 10/1977 | Ragle .......................... | 340/146.1 AL |

Primary Examiner—Charles E. Atkinson
Attorney, Agent, or Firm—R. Bruce Brodie

[57] ABSTRACT

Where data is recorded on logically independent sets of parallel channels or tracks, the correction of error of very long (infinite) length cannot be advantageously treated by conventional coding methods unlike finite length error such as single shot or burst noise. To ensure the correction of channels in error from data recovered from a multi-channel storage medium, a fixed number of channels per set are dedicated to error checking bits. In this invention, more than the usual number of channels in error in any one set are made correctable by adaptively reallocating the unused redundant channels in the other set. This is accomplished by encoding and recording in the first redundant channel in each set vertical parity checks limited to that set while encoding and recording in the second redundant channel of each set, the parity of data taken over both sets of channels in a predetermined positively or negatively sloped direction. With this type of parity information so recorded, then the data obtained from up to three known erroneous channels in any one set may be corrected, provided that two sets together aggregate not more than four channels in error. Advantageously, the vertical and cross-parity checking information can also be used to generate an internal channel-in-error pointer for the first erroneous track in each set. Additionally, this data can be made to yield a second internal channel-in-error pointer in at least one of the sets. Lastly, error patterns are identified upon decoding at the intersection of at least two error syndromes one of which is derived from cross-parity checking bits.

14 Claims, 21 Drawing Figures

ADAPTIVE CROSS PARITY DECODER

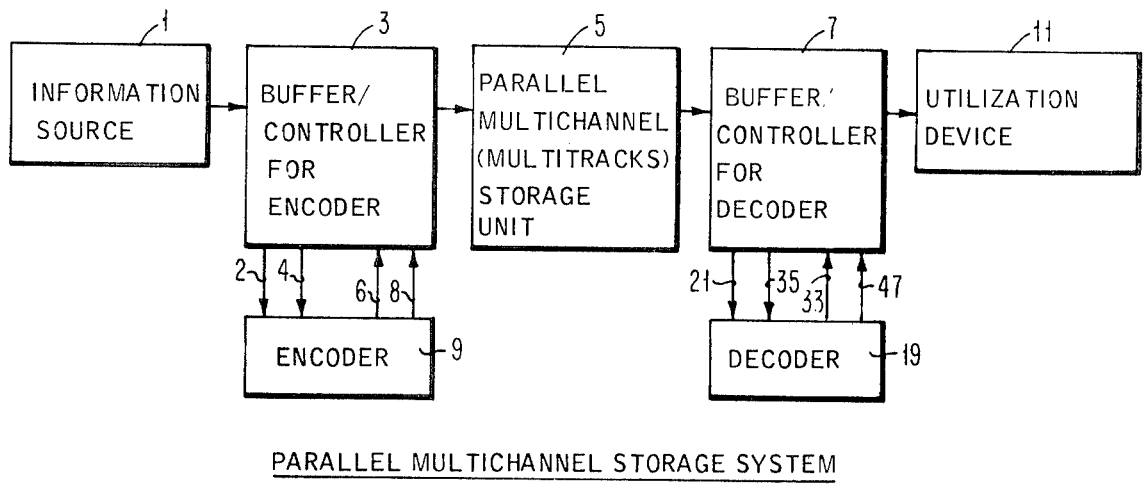
PARALLEL MULTICHANNEL STORAGE SYSTEM
FIG.1
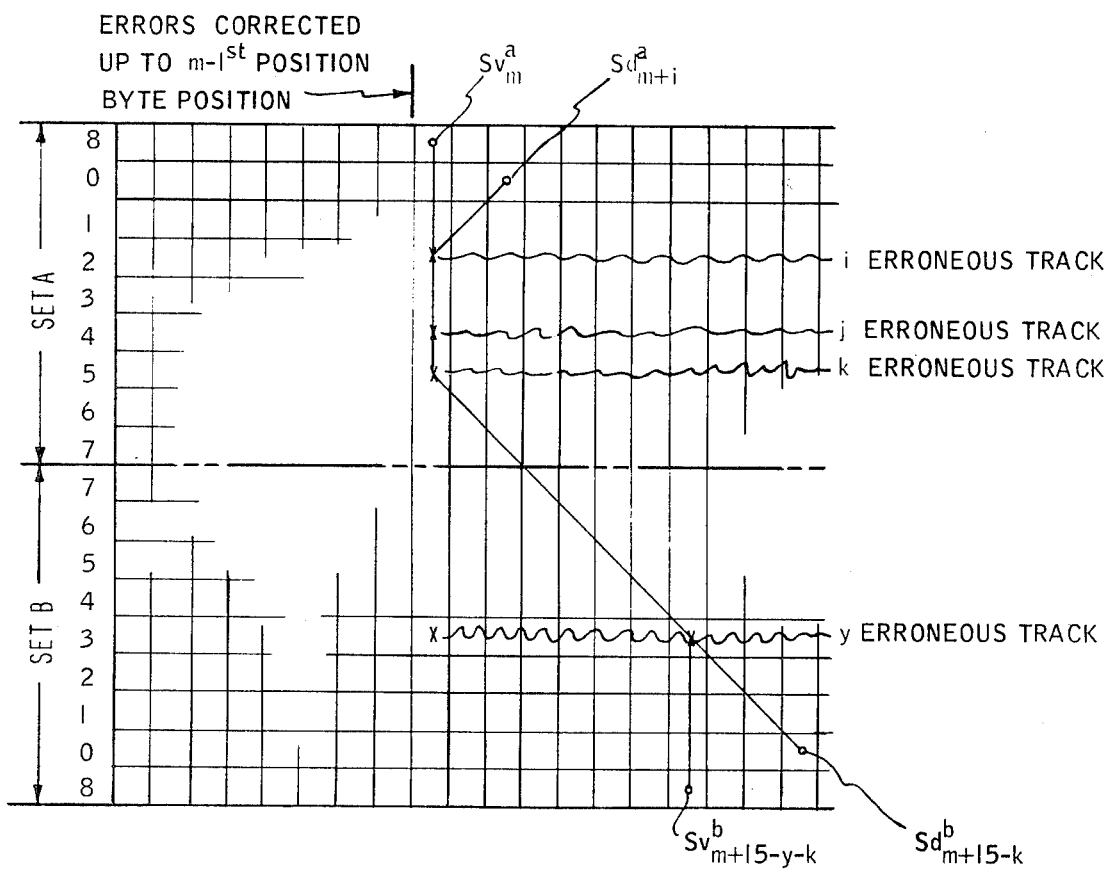
FIG.6  THREE TRACK CORRECTION IN SET A

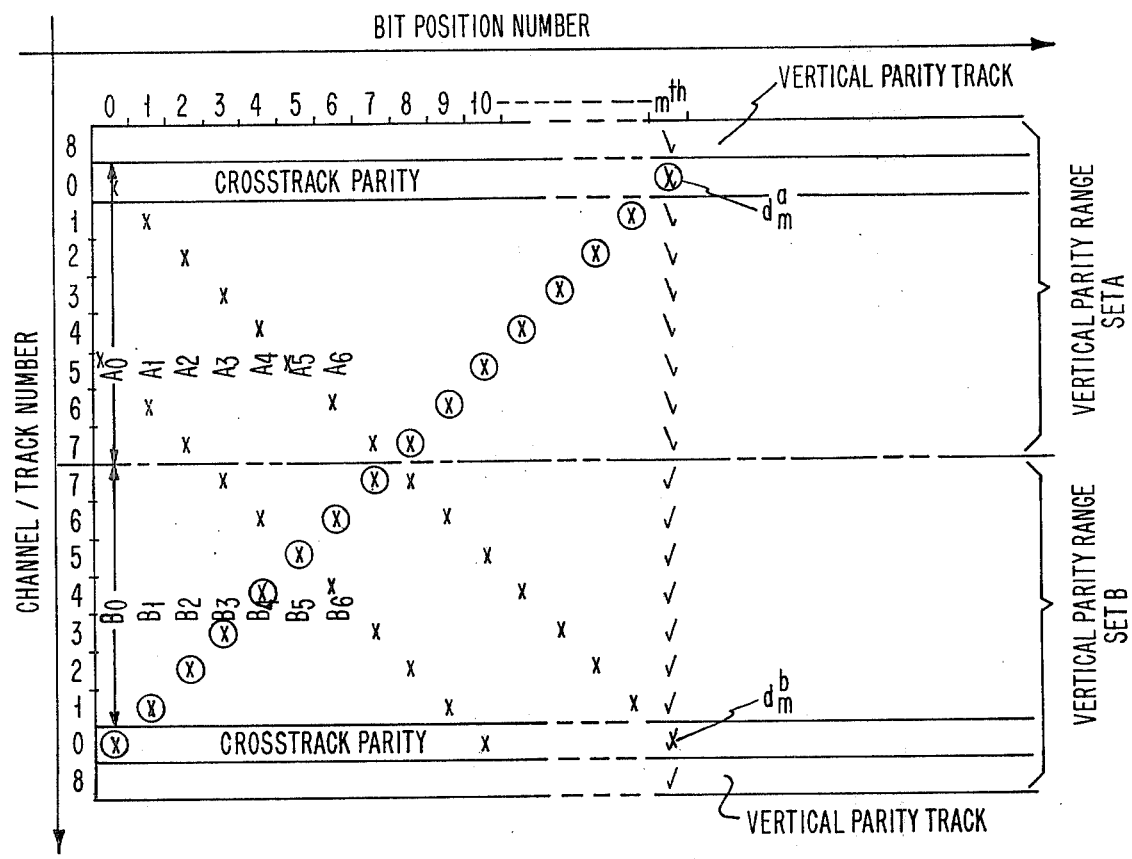
$$A_m(0) = \sum_{t=1}^{7} A_{m-t}(t) \oplus \sum_{t=0}^{7} B_{m-t-8}^{(7-t)}$$
$$B_m(0) = \sum_{t=1}^{7} B_{m-t}(t) \oplus \sum_{t=0}^{7} A_{m-8-t}^{(7-t)}$$
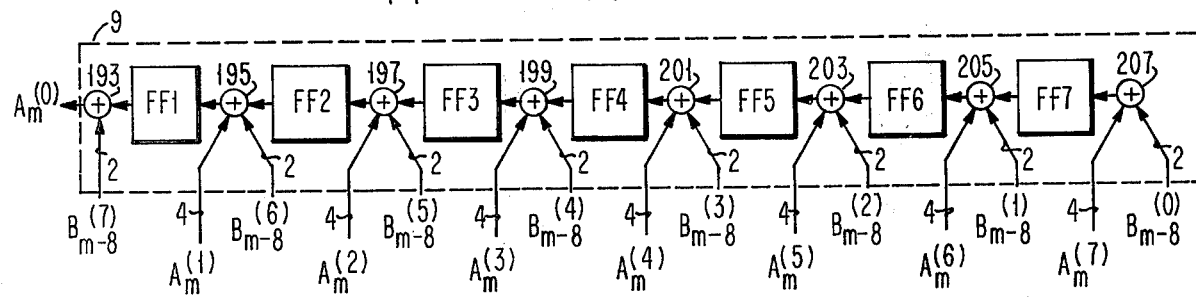
CROSSTRACK PARITY ENCODER WITH VERTICAL DATA BYTE FORMAT
FIG. 2

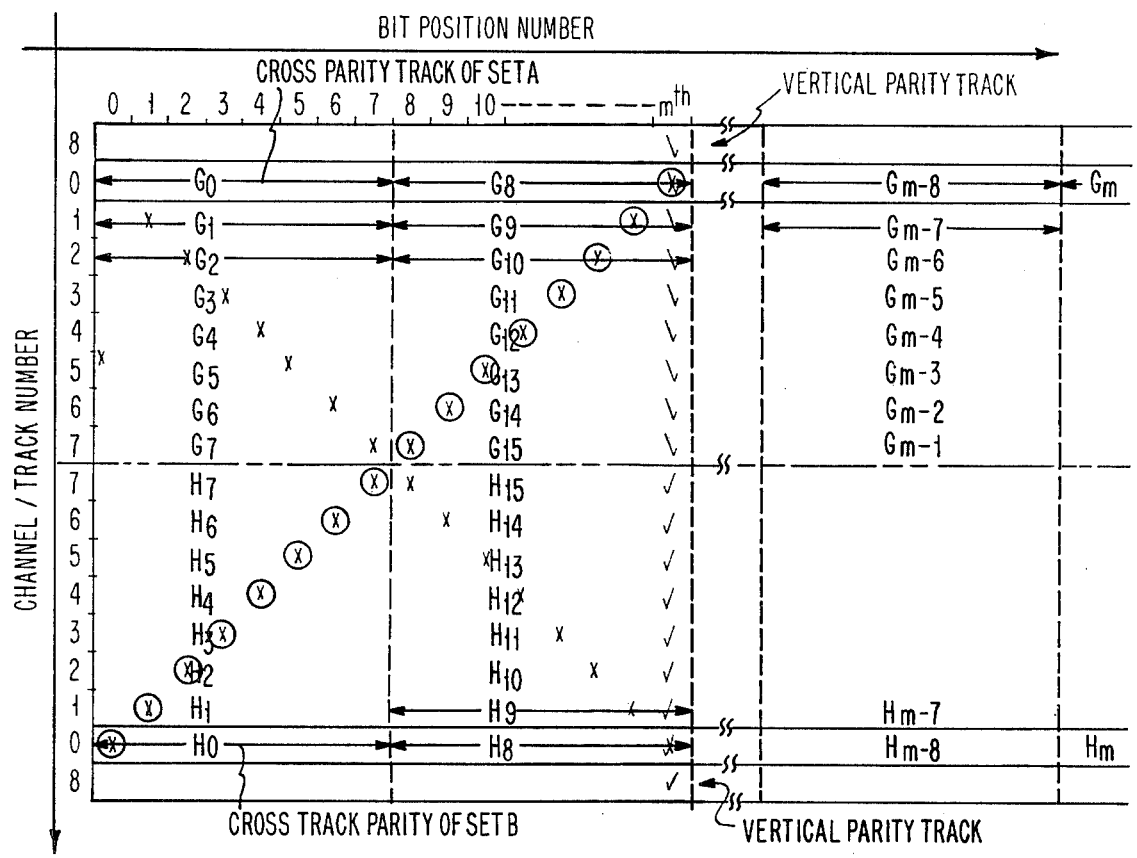
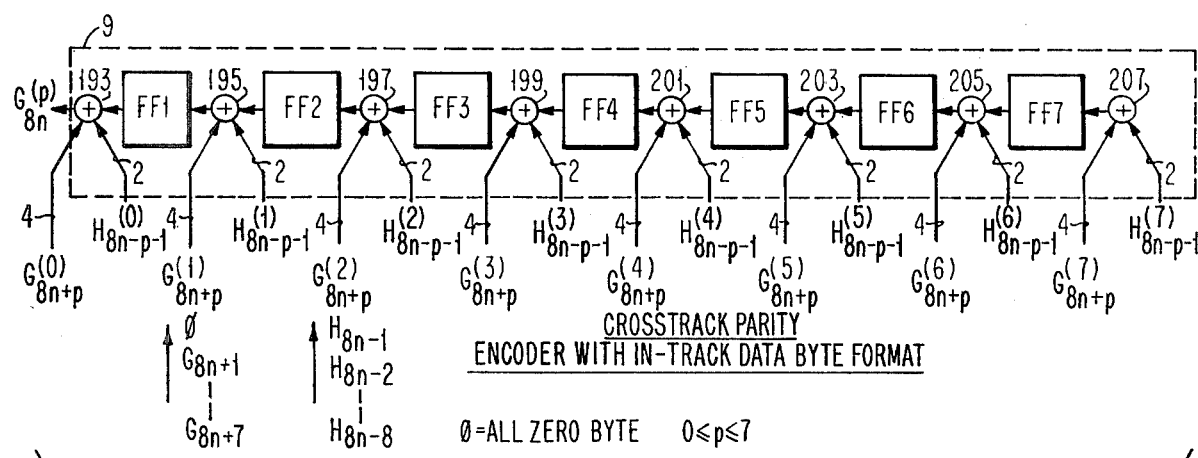
FIG. 3

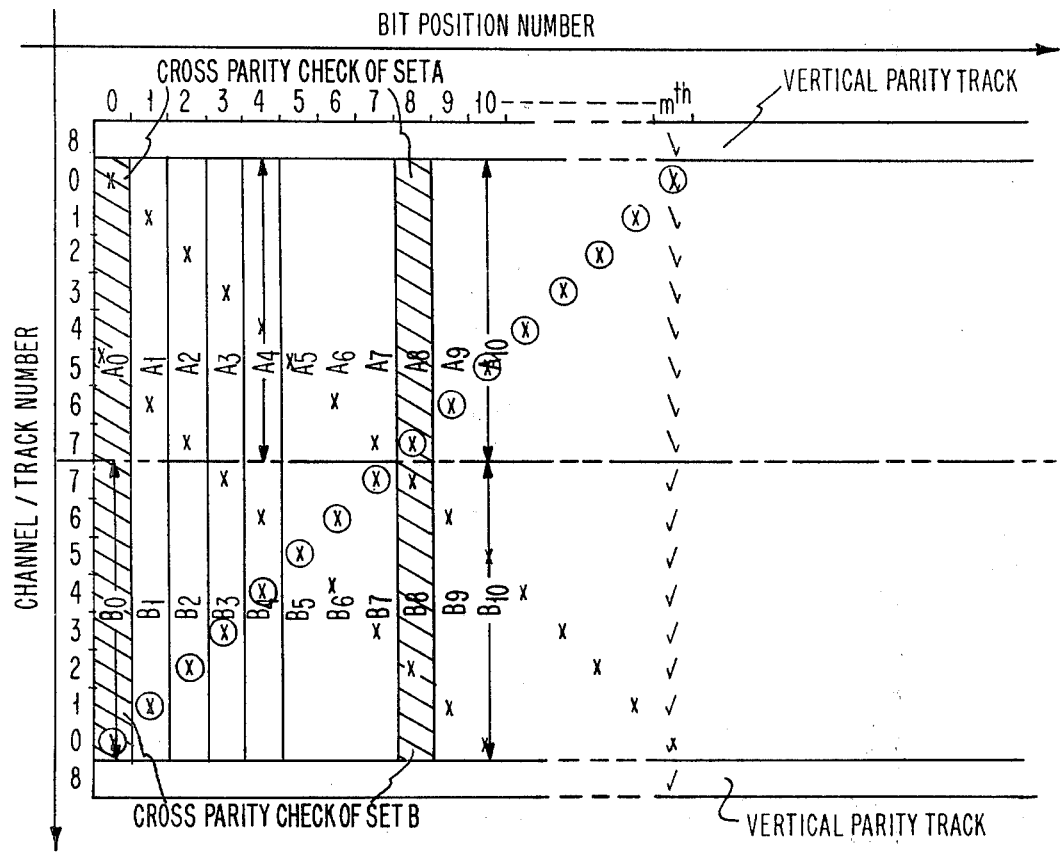
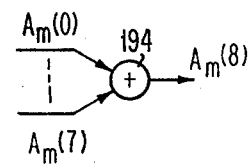
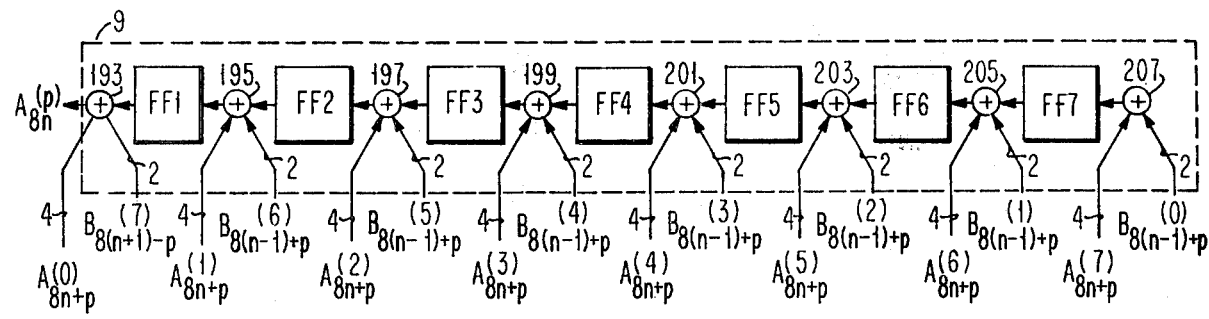
FIG.4

ADAPTIVE CROSS PARITY DECODER

SYNDROME GENERATOR FOR SET A

ERROR CORRECTOR FOR SET A

SYNDOME PROCESSOR A

ERROR PATTERN GENERATOR SET A

FIRST ERROR POINTER GENERATOR

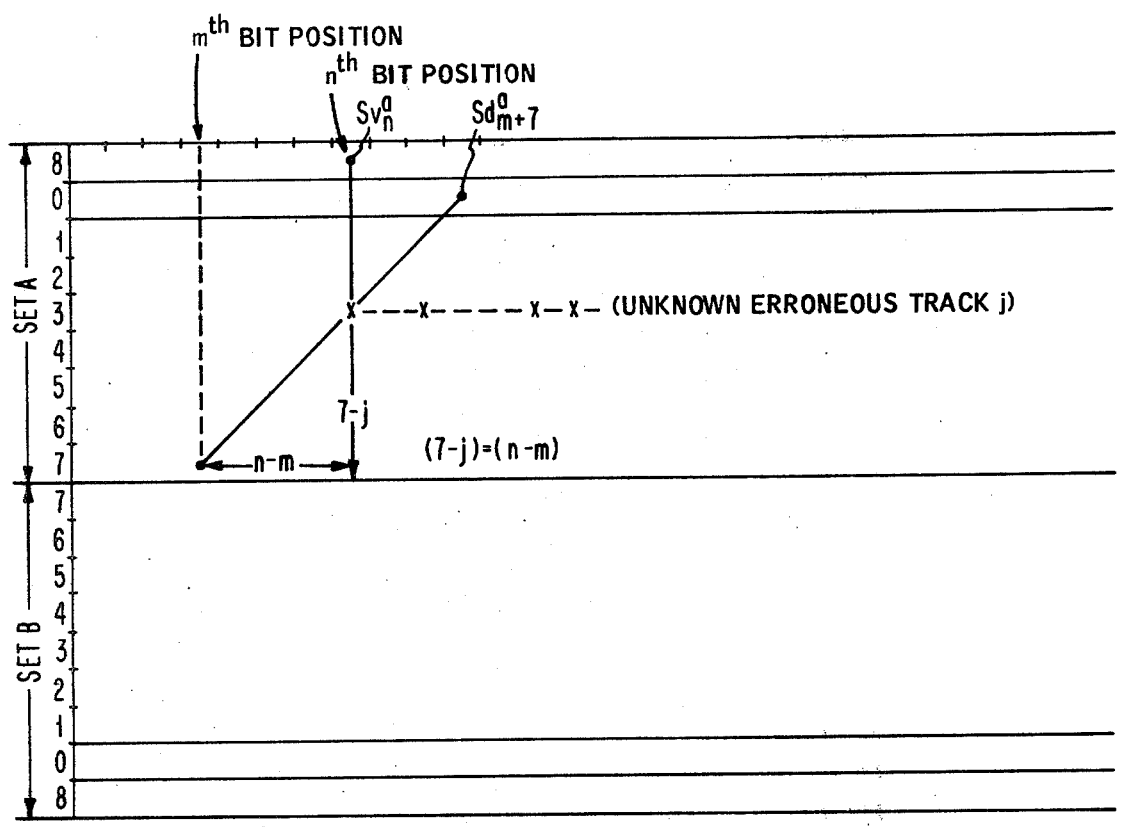
FIG.12a GENERATION OF FIRST TRACK-ERROR-POINTER-ASSERTION 1
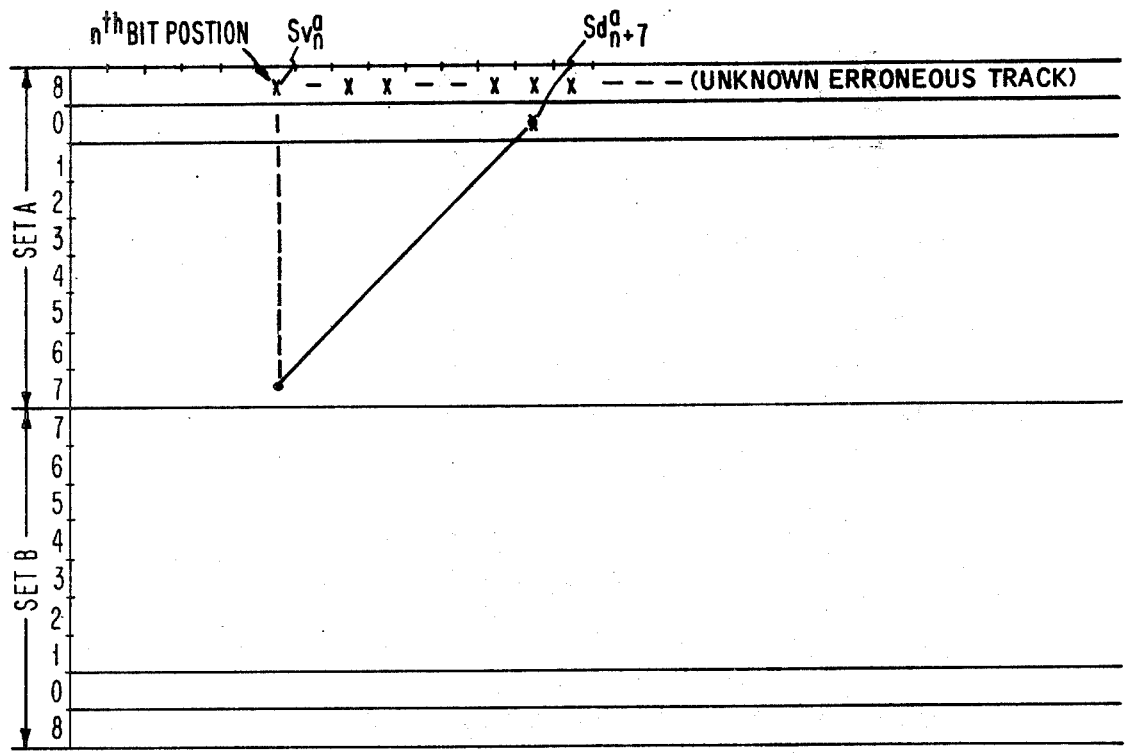
FIG.12b GENERATION OF FIRST TRACK ERROR POINTER-ASSERTION 2

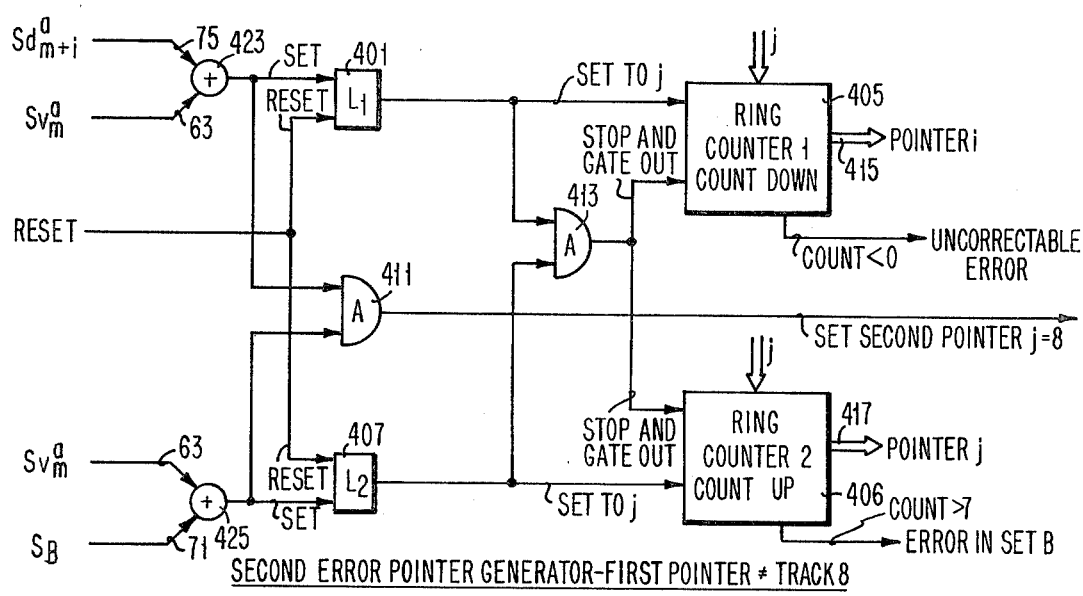
SECOND ERROR POINTER GENERATOR-FIRST POINTER ≠ TRACK 8
FIG. 13b
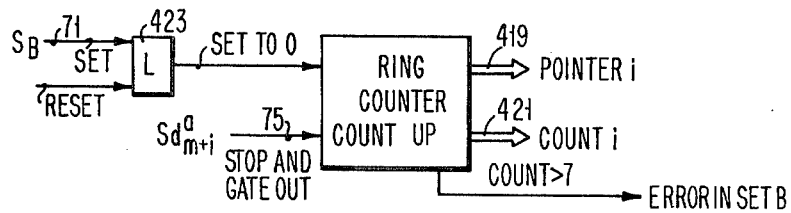
SECOND ERROR POINTER GENERATOR- FIRST POINTER = TRACK 8
FIG. 13c
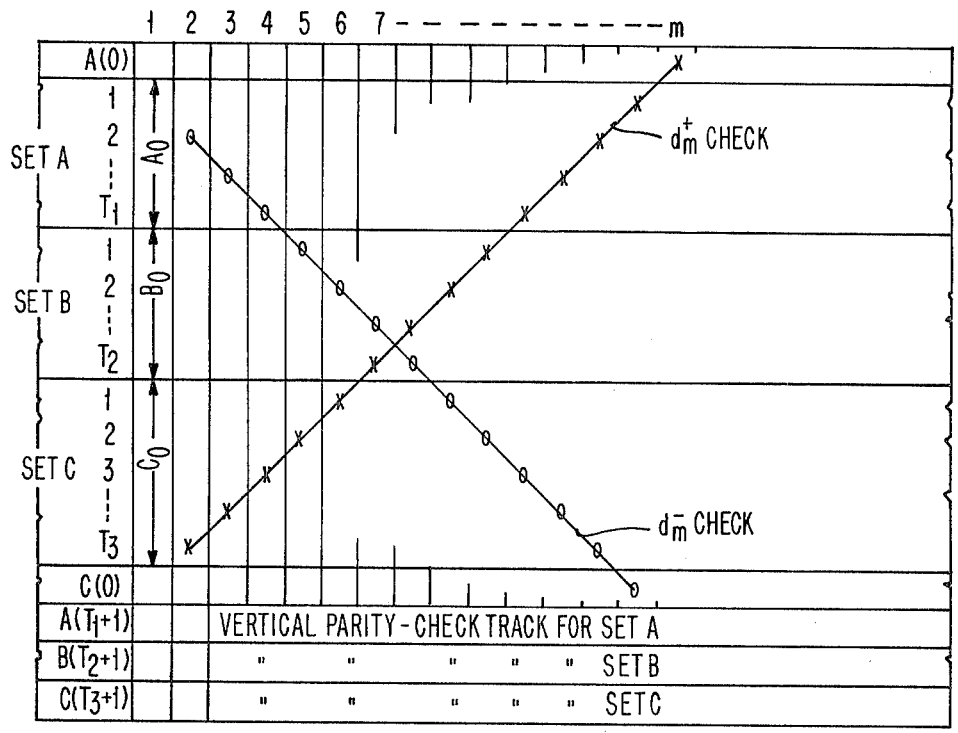
FIG. 14  VERTICAL AND DIAGONAL SYNDROMES WITH THREE SETS OF CHANNELS

PLURAL CHANNEL ERROR CORRECTING METHODS AND MEANS USING ADAPTIVE REALLOCATION OF REDUNDANT CHANNELS AMONG GROUPS OF CHANNELS

BACKGROUND OF THE INVENTION

This invention relates to the detection and correction of channels in error in a parallel multi-channel data handling system such as a magnetic tape storage system. More particularly, the invention relates to increasing the number of correctable channels in error among logically independent sets of channels recorded on the same medium without increasing the number of redundant channels per set.

In magnetic tape storage systems, industry standards have governed tape size, data format, and recording density. Conventionally, one-half inch width tape has been used for recording nine tracks thereon. By custom, data are recorded on 9 parallel channels with 9-bit bytes across the tape. Consideration in this invention is given to the recording and recovery of data recorded upon two or more logically independent sets of channels on the same medium.

Magnetic tape is soft and pliable. Unlike other forms of moving magnetic storage media, such as rigid magnetic disks, magnetic tape storage systems require the tape to move in non-uniform contact relation with one or more fixed heads as data is being transferred to or from the tape. Any loose particles of debris between head and tape or spots on tape with missing iron oxide causes loss of signal amplitude. Under the circumstances, it is possible for the read back clock in the erroneous channel to lose synchronization with the data in other, channels. Consequently, the recording and playback of data from the tape may be in error over very long segments. In this regard, the noisy length of tape poses a data recovery problem unlike that of either single shot noise or burst noise. Characteristically, single shot and burst noise induced errors are usually of finite duration. The reconstitution of the infected data is obtained by the use of error checking codes with cyclic properties. These codes are complex both in their theory and use. Illustrative of a magnetic tape storage device capable of variable density recording and utilizing a cyclic code for error detection and correction purposes is the IBM 3803 Controller for the IBM 3420 Models 4, 6, and 8 Tape Drives. The code actually employed is described in Hong et al U.S. Pat. No. 3,868,632.

The present commercial practice is to reserve two out of nine channels for recording redundant information about the remaining seven channels of the set. This enables up to two channels in error to be subsequently corrected. If there is contemplated the recording of two or more sets of parallel channels on a tape, there would continue to be reserved two redundant channels per set. With this format in mind, suppose one set of channels contained three channels in error while a neighbor set had none. It is clear that using present error checking techniques, there would be no effective way to take advantage of the unused redundancy of one set in order to assist in correcting multiple channels in error in another set.

The prior art is typified by Patel reissue U.S. Pat. No. Re. 28,923; Hong et al U.S. Pat. No. 3,868,632, and Louis IBM Technical Disclosure Bulletin, Vol. 14, page 3846, May 1972. In this regard, both Patel and Hong are directed to error correction in a nine-track tape. That is, where both the data and the redundant channel are part of the same logical set. Louis described a method of record recovery from a plurality of tapes by the calculation of a data value replacing unavailable data from a simple parity modulo 2 added to the remaining available data.

The limitation in error correction among multiple and logically independent sets of channels is to be distinguished from methods of correcting up to three known erroneous channels in a single set. The latter correction methods utilize codes which require an equivalent of three redundant channels as described by Patel in U.S. Pat. No. 3,851,306. To use such methods and their underlying codes requires three redundant channels in each of two interleaved nine-channel sets of an 18-channel tape system, that one could correct up to three known channels in error in each set. However, the redundancy of three channels per set of nine is wasteful, especially in view of the expectation that the occurrence of three erroneous channels in both sets simultaneously is highly unlikely.

SUMMARY OF THE INVENTION

It is an object of this invention to correct channels in error on a parallel multi-channel storage system. It is a related object to correct multiple channels in error even where the number of error channels exceeds the number of redundant channels per set. It is yet another object to correct multiple channels in error in a first set utilizing information recorded on redundant channels in a second set. It is yet another object that such channel correction be obtained independent of the direction of data recording, i.e. in the in-channel or cross-channel direction on the medium.

The foregoing objects are satisfied by an apparatus which encodes parity checking bits in two redundant channels of each set of a pair of logically independent sets of channels. There is encoded and recorded in the first redundant channel in each set vertical parity checks limited to the data recorded in the channels of its own set, while there is encoded and recorded in the second redundant channel cross-parity checks taken over all of the channels in both sets in a predetermined positively or negatively sloped channel direction. Alternatively, the cross-parity checks (diagonal checks) of the second redundant channel can be recorded as check bytes distributed among data bytes at fixed intervals.

The correction of error is the calculation of a data value to replace a corresponding error value. In the instant invention, this is achieved by firstly deriving an error correction signal from the logical values of at least a pair of intersecting syndromes, the syndromes being obtained from the redundant channel parity data inclusive of the error. For each pair of intersecting syndromes, at least one syndrome is required to be taken in a diagonal direction. Secondly, up to three known channels in error in any one set may be corrected from the recorded information by combining error correction signals derived from the logical values of the intersecting syndromes with the originally recorded channel data. This is provided that the two sets together indicate not more than four channels in error. This adaptive feature may be extended to parallel multi-channel systems having three or more logically independent sets of channels. Also, the reallocation of unused redundancy can further be extended to the trade-off between the detection and correction of channels in error. In this latter regard, analog devices can be used to detect error and provide external error-pointers, thereby increasing the correction capability of this invention.

It is possible in this invention to generate internal pointers to channels-in-error. In one version, a channel error pointer can be generated for the first erroneous channel in each set from the recorded parity bits. By a further adaptive usage, a second channel-in-error pointer in at least one set can also be generated without any increase in the number of redundant channels in either set.

It is yet another aspect of this invention, that the distinctive data formats can be used in the encoding, recording, retrieval, and decoding as data in a parallel multi-channel data handling system. In a first format, the diagonal parity of check bits appears in separate checking channels. In a second format, the diagonal parity check bits appear as check bytes distributed among data bytes at fixed intervals. In still another variation, the format records information as bytes across the channels, or bytes along the channels.

In the prior art, data and redundant channels were cross-correlated only among themselves. With the advent of recording data in plural independent sets upon the same medium, this invention teaches that unused redundancy may be reallocated with a modest amount of cross correlation among the data in channels of both sets. This is achieved by encoding the error checking information on the basis of diagonal cross channel parities taken across both sets in combination with vertical parities taken only within their own set.

The foregoing and other objects, aspects, and advantages of the invention will be apparent from the following more particular description of the preferred embodiment of the invention as illustrated in the accompanying drawing.

BRIEF DESCRIPTION OF THE DRAWING

FIG. 1 is a block representation of a parallel multi-channel storage system inclusive of the parity encoder for data writing and parity decoder for data error checking when data reading according to the invention.

FIG. 2 shows a cross track parity encoder correlated with the track and bit positions as used with a vertical data byte tape format.

FIG. 3 also shows a cross track parity encoder correlated, however, with an in-track data byte tape format.

FIG. 4 exhibits a cross track parity encoder in which both the cross track parity as well as the data byte are recorded in vertical byte tape format.

FIG. 6 illustrates the occurrence of three erroneous channels or tracks in a first set together with one erroneous track in a second set.

FIG. 9 shows the detailed logic for the syndrome processor for set B, while

FIG. 12a–b depicts the generation of a first channel-in-error pointer in Set A.

FIG. 13b–c represent the detailed logic for the generation of a second channel-in-error pointer Set A when the first pointer is given to be other than 8th track or 8th track respectively.

FIG. 14 illustrates the vertical and diagonal parity checks with three sets of channels.

DESCRIPTION OF THE PREFERRED EMBODIMENT

Figure 5:
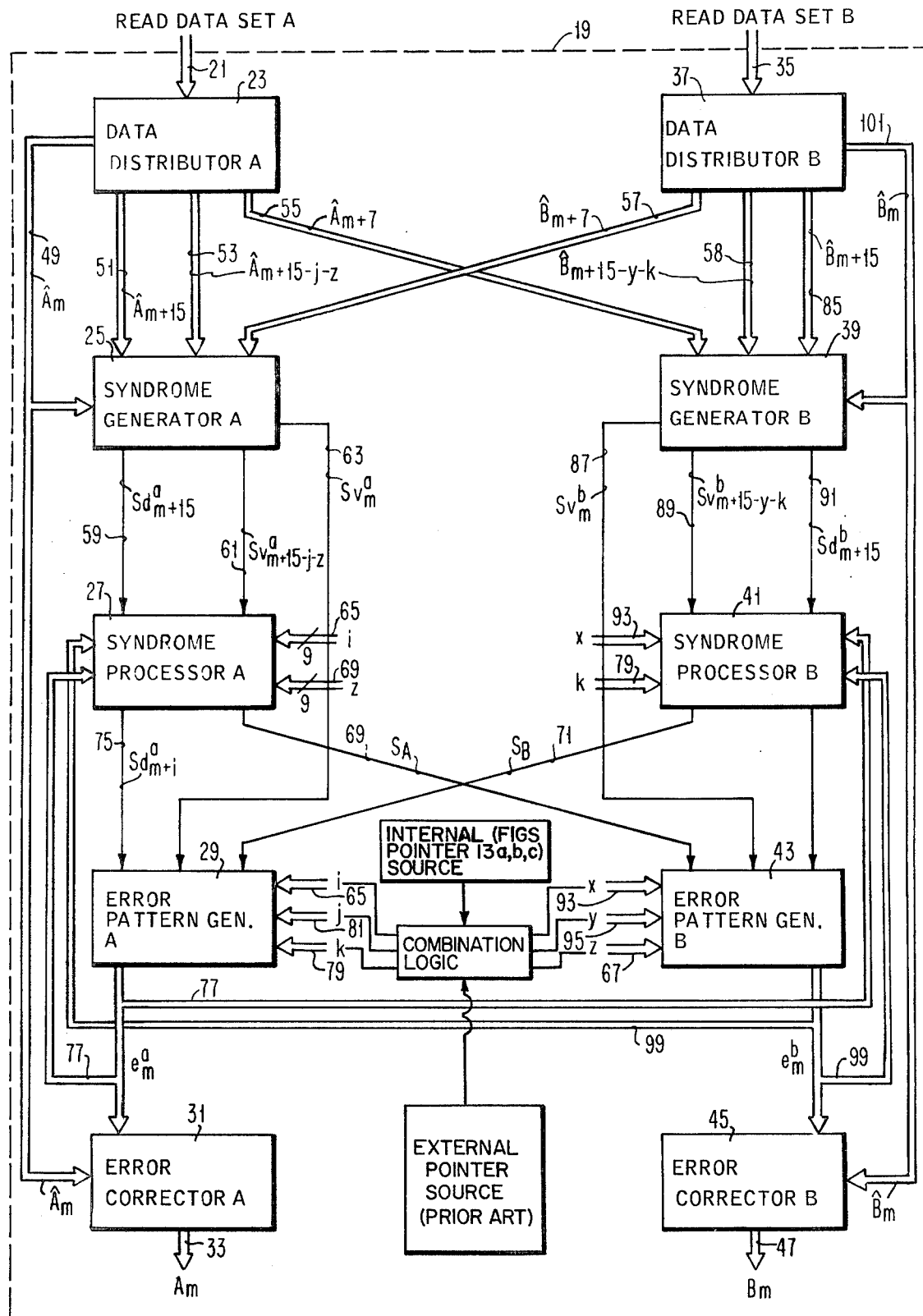
FIG. 5 shows the general logic for an adaptive cross parity decoder showing the calculation of the necessary parity syndromes, the detection of error and the generation of a stream of corrections for channels in error from among two sets.

Referring now to FIG. 1, there is shown a general block diagram of a parallel multi-channel storage system incorporating the invention. Information from source 1 is applied to buffer/controller 3. The controller orchestrates the formatting of the data, securing the necessary parity encodings, and causing said formatted and parity encoded data to be recorded on two sets of logically independent parallel channels in storage unit 5. Correspondingly, buffer/controller 7, when activated, reads data previously recorded on said parallel channels, reformats and decodes said data for application to a utilization device 11.

Operationally, information in buffer 3 is fed in parallel form to an error correction encoder 9 over paths 2 and 4 wherein check and parity bits are sequentially generated for information signal sets referred to as bytes. As these parity and check bit signals are recorded with the information signals, then upon reading of both from the storage unit 5, the additional (redundant) signals may be used to correct any errors in the information signals. The decoder 19 of the present invention, enables calculation of syndromes using signals grouped in a so-called vertical direction, and in a positively or negatively sloped cross channel (diagonal) direction.

Referring now to FIG. 2 there is shown the format for recording 18 parallel tracks along a tape. This format is similar to the nine-track format in which one of the tracks (track 8) is reserved to record "parity" over the other 8 tracks. Such parity bit is known as the vertical redundancy check (VRC) bit as set forth in U.S. Pat. Nos. 3,508,194, 3,508,195, and 3,508,196. Each byte $A_m$ consisting of 8 bits and the VRC bit is simultaneously recorded in each of the 9 tracks of each of the sets. It may be recovered from such recorded channel by readback and reassembly into bytes in accordance with Floros U.S. Pat. No. Re. 25,527. In the FIG. 2 format track 0 in each set of 9 tracks is also reserved for parity encoding. Each cross track (diagonal) parity checks $d_m{}^a$ and $d_m{}^b$ represent the simple parity of bits recorded in a positively or negatively sloped cross channel direction. In contrast, the VRC bit for the mth bit position for the channels of set A covers only those bits in the vertical direction limited to set A while the same is true for the corresponding VRC bit for the mth position for set B.

Given that there are 18 parallel tracks recorded along the tape, then the tracks may be grouped into two sets as shown. Set A consists of any 9 parallel tracks, while set B consists of the remaining 9 parallel tracks. In FIGS. 2, 3, and 4, the two sets are shown side by side with a particular ordered arrangement of the tracks. In practice, the tracks from the two sets may be interleaved and may be arranged in any other order.

Let $A_m(t)$ and $B_m(t)$ denote the mth bit in the $t^{th}$ track of set A and set B respectively. The track number t takes on the values from 0 to 8 in each set. The bit position m takes on values from 0 to M. The $0^{th}$ and the $8^{th}$ tracks in each set are check tracks. Each check bit in the $0^{th}$ track of set A provides a parity check along the diagonal with positive slope involving, as previously mentioned, bits from both sets as seen in FIGS. 2 through 4. As an example, the mth diagonal check of set A termed $d_m^a$ check is given by the encoding equation;

$$A_m(0) = \sum_{t=1}^{7} O\, A_{m-t}(t) \oplus \sum_{t=0}^{7} O\, B_{m-t-8}(7-t) \quad (1)$$

$\Sigma O$ = modulo 2 sum
$\oplus$ - exclusive OR

Each check bit in the $0^{th}$ track of set B provides a parity check along the diagonal with negative slope involving bits from both sets as seen in FIGS. 2 through 4. The $m^{th}$ diagonal check of set B, called $d_m^b$ check is given by the encoding equation:

$$B_m(0) = \sum_{t=1}^{7} O\, B_{m-t}(t) \oplus \sum_{t=0}^{7} O\, A_{m-t-8}(7-t) \quad (2)$$

In this invention, parity is taken to mean "even parity". "Even parity" is the assigning of a bit value in the "parity position" so that the number of ones, including the parity bit over the range of interest is even (a modulo 2 sum).

Equations (1) and (2) can be rewritten in a symmetrical form as:

$$\sum_{t=0}^{7} O\, [A_{m-t}(t) \oplus B_{m-t-8}(7-t)] = 0 \quad (3)$$

$$\sum_{t=0}^{7} O\, [B_{m-t}(t) \oplus A_{m-t-8}(7-t)] = 0 \quad (4)$$

Referring particularly to FIG. 2, at the beginning of the record, computations of the diagonal check bits for positions 0 through 15, involve data bit values from void positions (negative position numbers).

These data bit values will be arbitrarily considered to have 0 binary value. Likewise, at the end of the record, in order to provide diagonal checks to all bits in each track, the $0^{th}$ check track in each set should be extended 15 positions. The check bits on the extended positions also involve some data bit values from void positions. This also will be assumed to have 0 binary value.

Each check bit in the 8th track of set A is a vertical parity over the same bits of the same position m in set A. The $m^{th}$ vertical parity check of set A designated $V_m^a$, is denoted by the equation:

$$\sum_{t=0}^{8} O\, A_m(t) = 0 \quad (5)$$

Similarly, the $m^{th}$ vertical parity check of Set B designated $V_m^b$ is formed by the equation:

$$\sum_{t=0}^{8} O\, B_m(t) = 0 \quad (6)$$

One other general aspect of the formats shown in FIGS. 2 through 4 should be mentioned and this concerns the relationship to the recording of information and the direction of the track. In FIG. 2 the data bytes for each track set are recorded in the vertical direction. This also includes the cross track parity bit. Thus, for byte $A_0$ each of the 7 information bits are recorded in the 0 bit position across tracks 1 through 7 while the cross track parity bit is recorded in the 0 bit position for track 0. The same occurs for say byte $B_4$ for recording information in the other set of tracks (set B).

In the format shown in FIG. 3, track 0 in each set is still reserved for recording the cross parity bits. However, data bytes are recorded in the in-track direction. In this format, the 9 track record is partitioned into blocks, each block containing 7 data bytes and two check bytes placed along the tracks. While there are still two check tracks as shown in the format of FIG. 2, however, the conventional 8 bit bytes are used in the encoding and decoding process and are recorded as bytes along the tracks. This is distinguished from using the characters across the tracks which consist of 7 data bits and 2 check bits in the format of FIG. 2.

Referring now to the format in FIG. 4, one must recall the format from FIG. 2 where the diagonal parity of check bits appear in two check tracks. In that format, the vertical characters $A_m$ and $B_m$ consists of 7 data bits and 2 check bits. This is distinguished from the conventional 9 track recording of one-half inch magnetic tape with a vertical character or bytes consisting of 8 data bits and a vertical parity check bit. In the format of FIG. 4, $A_0$, $A_8$, $A_{16}$, and $A_{24}$ - -, provide the diagonal parity check with positive slope while $B_0$, $B_8$, $B_{16}$, $B_{24}$ - - -, provide the diagonal parity check with negative slope. All other bytes are data bytes consisting of the conventional 8 data bits with a vertical parity check bit.

Juxtaposed to each of the multi-track tape formats in FIGS. 2 through 4, a counterpart encoder 9 of the shift register type is capable of generating the cross track parity bits to be subsequently recorded by buffer/controller 3 on the 0 track in storage unit 5 of the respective sets, for the formats of FIGS. 2 and 3. In the case of the vertical format of FIG. 4, a full byte of cross check parity bits must be vertically recorded.

Referring now to FIG. 2, encoder 9 consists of a 7-stage flip-flop shift register, FF1, FF2, ..., FF6, and FF7. Interposed between each shift register stage is a multiple input, single output exclusive OR gate (XOR). XOR gates 195, 197, ... 205 in addition to coupling one register stage to another (FF2 to FF1) also have dedicated inputs to bits positioned diagonally across the tracks of both sets. In this regard, XOR gate 193 terminates $B_{m-8}(7)$ while the remaining XOR gates terminate two inputs each. XOR 195 terminates $A_m(1)$ and $B_{m-8}(6)$ down to and including XOR 207 terminating $A_m(7)$ and $B_{m-8}(0)$.

Encoder 9 in FIG. 2 implements equation 1 for the calculation of $A_m(0)$. Now $A_m$ is a 7 bit data character while $B_{m-8}$ is an 8 bit character which includes the check bit previously computed. The check bits $A_0(0)$, $A_1(0)$, $A_2(0)$ ... $A_m(0)$ are generated in a continuous shift and are generated at the output of XOR 193 of shift register 9 as the 7 and 8 bit $A_m$ and $B_{m-8}$ characters are entered in order. The $m^{th}$ check bit $A_m(0)$ is generated when $A_m$ and $B_{m-8}$ are entered. Note, that $A_m$ or $B_m$ with negative value of m is an all 0 character. A counterpart encoder for generating the cross byte parity bits for $B_m(0)$ defined by equation 2, although not shown, can easily be constructed.

Referring now to encoder 9 in the in-track data byte format for FIG. 3, there is now notation G and H for in-track bytes and some variation in the bit assignments to the counterpart XOR's to conform to the requirements of the format. As shown $\Phi$ is an all 0 byte, while $H_{8n-8}$ is a previously computed check byte. The other $G_{8n+p}$ and $H_{8n-p-1}$ are 8 bit data bytes (p varying between 0 and 7). Check bytes $G_0, G_8, G_{16}, \ldots, G_{8n}$ are generated in a continuous shift and enter process bit by bit at the output of the shift register as the $\Phi$ byte and data bytes including check bytes from Set B are entered in the order shown. Again, $G_m$ or $H_m$ with negative value of m is an all 0 byte. Note that in this embodiment XOR 193 terminates two inputs, namely $G_{8n+p}(0)$ and $H_{8n-p-1}(0)$. The logic for defining the computation of the parity bit is represented respectively in this diagram in accordance with the relationship of $A_m(t)$, $B_m(t)$ of the equation (3) and for the counterpart encoder for set B, as per equation (4).

Referring now to encoder 9 in FIG. 4 relating to vertical cross track and data byte format, $\Phi$ is an all 0 byte while the $A_{8n+p}$ and $B_{8(n-1)+p}$ are 8 bit data bytes with p ranging between 0 and 7.

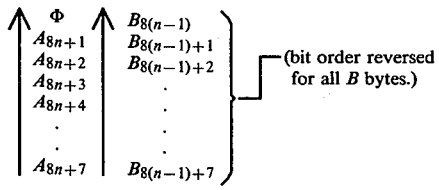

Check bytes $A_0, A_8, A_{16}\ldots A_{8n}$ as are the check bytes interspersed among data bytes as shown in FIG. 4. These check bytes are generated in a continuous shift and enter process. This occurs as the bit by bit output of the shift register responds to the $\Phi$ byte and data bytes entered in the above order. Also note that $A_m$ or $B_m$ with negative value of m is an all 0 byte. Again equations 3 and 4 define the necessary logic for the organization of a shift register to generate the checking bit. Also, XOR 193 in this embodiment terminates two inputs as does XOR in the FIG. 3 embodiment. It should be especially observed that the bit order for $B_{8(n-1)+p}$ is reversed. Parenthetically, vertical parity check generation may be accomplished by a simple modulo 2 addition of all the bits taken in the vertical track direction.

At this point the reader is reminded that the organization of buffers 3 and 7, as well as the internal controls of storage unit 5, are part of the prior art so that the detailed relationship between encoder 9 and buffer 3 bears much the same relationship as that to be found between the IBM 3803 controller and the 3420 tape drive.

The focus of interest shifts from the mechanisms by which the vertical and cross channel parity bits are generated, formatted and recorded on parallel multi-channel storage media to the ultimate object of the invention. This is namely the correction of channels in error among two or more logically independent sets of channels utilizing the unused redundancy of channels in a neighboring set. In subsequent discussion attention will first be directed to error syndromes and then the decoding process. The discussion of the decoding process will include firstly, separate descriptions of 3 track correction and 2 track correction and 1 track correction in set A with pointers. Secondly, embraced in the decoding process is a discussion of generation of the first track pointer in set A. Also, discussed is the generation of second track pointers in set A when the first track in error is known. Once the pointers are generated, then the errors can be corrected as discussed in the first procedure. Finally, error correction and pointer generation in set B is discussed.

Referring now to FIG. 1, decoder 19 is shown interacting with buffer 7 in receiving data over paths 21 and 35 and returning decoded data over paths 33 and 47. FIG. 5 is a logical diagram showing the details of the adaptive cross parity decoder. Data applied over input path 21 and path 35 are respectively applied to independent processing paths. The processing path consisting of elements 23, 25, 27, 29, and 31 is directed to generating error correction for the channels in set A while elements 37, 39, 41, 43, and 45 generate error correction for the channels in set B.

Data with error on the parallel tracks of Set A is applied on path 21 to data distributor 23. Correspondingly, data on the 9 tracks of set B are applied via path 35 to data distributor 37. Correction information for the data from set A is returned to the decoder over path 33 and correction information for set B is returned to the decoder over path 47. It will be observed that each of the processing paths consists of the same functional logic, such as the data distributor 23, a syndrome generator 25, a syndrome processor 27, an error pattern generator 29, and an error corrector 31. The corresponding processing path elements for set B are 37, 39, 41, 43, and 45 in that order. First, consideration should be given to error syndromes.

Syndrome Determination

Let the bit values as they are read from the tape for the sets be denoted as $A_m(t)$ and $B_m(t)$ respectively. These read back bits may be corrupted by errors. Significantly, the result of the parity checks of equations (3), (4), (5), and (6) apply to the read back data is called "the syndrome of error". A non-zero "syndrome" is a clear indication of the presence of an error.

The $m^{th}$ diagonal parity check of set A yields the syndrome:

$$Sd_m^a = \sum_{t=0}^{7} O\ [\hat{A}_{m-t}(t) \oplus \hat{B}_{m-t-8}(7-t)] \quad (7)$$

The $m^{th}$ diagonal parity check of set B yields the syndrome:

$$Sd_m^b = \sum_{t=0}^{7} O\ [\hat{B}_{m-t}(t) \oplus \hat{A}_{m-t-8}(7-t)] \quad (8)$$

The $m^{th}$ vertical check for set A yields the syndrome:

$$Sv_m^a = \sum_{t=0}^{8} O\ \hat{A}_m(t) \quad (9)$$

The $m^{th}$ vertical check for set B yields the syndrome:

$$Sv_m^b = \sum_{t=0}^{8} \hat{B}_m(t) \tag{10}$$

The modulo 2 difference between the read $\hat{A}_m(t)$ and the written $A_m(t)$ is called the error pattern $e_m^a(t)$ in the $m^{th}$ position of the $t^{th}$ track in set A where $$e_m^a(t) = \hat{A}_m(t) \oplus A_m(t) \tag{11}$$

Similarly, for set B, $$e_m^b(t) = \hat{B}_m(t) \oplus B_m(t) \tag{12}$$

Combine equations (3) and (7), Equations (4) and (8), equations (5) and (9) and equations (6) and (10) and substitute $e_m^a(t)$ and $e_m^b(t)$ of equation (11) and (12). Then $$Sd_m^a = \sum_{t=0}^{7} [e_{m-t}^a(t) \oplus e_{m-t-8}^b(7-t)] \tag{13}$$

$$Sd_m^b = \sum_{t=0}^{7} [e_{m-t}^b(t) \oplus e_{m-t-8}^a(7-t)] \tag{14}$$

$$Sv_m^a = \sum_{t=0}^{8} e_m^a(t) \tag{15}$$

$$Sv_m^b = \sum_{t=0}^{8} e_m^a(t) \tag{16}$$

Many different types of errors can be corrected by processing these syndromes. In tapes, the predominant errors are track errors caused by large sized defects in the magnetic medium. The erroneous track may be identified by detecting loss of signal, excessive phase error, inadmissible recording pattern, or any other similar external pointer. In the absence of such external pointers, the erroneous track can still be identified by processing the syndromes. Any one of the following combinations of track errors can be corrected by processing the syndromes.

1. Up to three known tracks with errors in one set and up to one known track with errors in the other set.
2. Up to two known tracks or one unknown track with errors in each of the two sets.
3. Up to two tracks in error (one of which is known) in one set and up to one known track with errors in the other set.

Decoding Process and Means

The decoding process includes the accessing of data and the transferring of the data from the parallel multi-channels of storage unit 5 to the buffer/controller 7. Here, buffer/controller 7 coacting with decoder 19 ascertains whether, in fact, any of the channels are erroneous and generate correction signals. In discussing multiple track correction, one is reminded of the trade-off between using redundancy to establish the fact that the bits in a given channel are in error and/or using that redundancy to correct the error. Correction of error is the calculation of a data value to replace a corresponding error. In the instant system, this is achieved by combining the logical values of intersecting syndromes inclusive of the error. In this sense, each pair of intersecting syndromes requires one syndrome which is taken in a diagonal direction.

Up to the present point, reference has occasionally been made to the use of pointers for designating a channel or track in error. In much of the subsequent discussion reference will continue to be made to pointers, their generation and use. Pointers may be externally derived or internally generated. In this regard, external pointer generation usually requires some form of analog sensing of the playback conditions of data recorded on any of the several channels. The manner and means of external pointer generation is beyond the scope of this invention. Suffice to say that in the absence of external pointers, this invention includes means for generating one or more internal pointers for error correction purposes as well as in the presence of external pointers. The following comments are directed to the generation of pointers and the interrelationship between internal and external pointers. This should provide a basis for the consideration of the detailed multiple channel or track correction in each of the logically independent sets with the aid of pointers.

A record is written on a tape with the object to play it back error-free. When a tape is started and a record is at m=0, one can assume there are no errors and all the pointers are off. If, after a period of time, an error occurs on one of the channels, for example Set A, and further no external pointer was raised to indicate the channel error, it is necessary to generate a first internal error pointer to identify the channel. In the embodiment of this invention, this can be accomplished within seven digit positions along the channel before the error has occurred.

Once the first internal pointer in Set A was generated, it would be kept on for the correction of errors in the indicated channel for the duration of the playback operation. Of course, such an assignment of a pointer might unduly limit the correction capacity of the system. This is especially true if there was no continuous error in the indicated channel. Consequently, some systems provide that a pointer can be extinguished if no error occurs within a predetermined interval after initial error detection.

In this hypothetical example assume the occurrence of an error in a channel in Set B. The channel identity will be generated by either an external or internal first pointer in that set. Because each set includes two redundant channel equivalents, it follows that the detection of a first channel in error in Set B is well within the correction capabilities of the system. It is further the case that the first pointer in Set B will be kept on for the correction of errors in the indicated channel. But what happens if another error occurs in Set B? This can likewise be indicated by a second pointer. However, the pointer to any third channel in error in Set B can only be externally generated.

To restate the situation, the first internal pointer in any given set gates on in the absence of any other pointers with respect to that set. This implies that a first internal pointer in Set A will be gated on given no other pointers in Set A and up to two pointers on in Set B. Relatedly, a second internal pointer in Set A may be internally activated only when there exists a first pointer for Set A and there are no more than one pointer on for Set B. The second internal pointer is activated irrespective of whether the first pointer is internally or externally generated in that set.

While internal pointers are believed to be most reliable, at the most three of the four pointers available in the system of the preferred embodiment may be generated internally. Also, two simultaneous internal pointers cannot be generated in the same set. This is because the second internal pointer requires the existence of a first known pointer as a condition precedent.

As previously mentioned, the ensuing discussion will describe the method and means for multiple track correction and pointer generation. In this sense, the generation of internal pointers takes advantage of the diagonal parity checks covering all of the channels in both sets as well as the vertical parity checks limited to the channels of their respective sets. This is also involved in the dynamic reallocation of redundancy unused in one channel set for the channel error correction in the other channel set.

Three-track Correction in Set A With Pointers

Referring now to FIG. 6, there is depicted three erroneous tracks in Set A. Errors, confined to the three known tracks in Set A, are correctable if Set B is either error free or has only one known track in error. The erroneous tracks are there indicated by track error pointers, i, j, k in Set A and pointer y in Set B. If pointer y is undefined, then Set B is assumed to be error free.

For convenience in decoding, pointer i is the lowest and pointer k is the highest of the track indices among the erroneous tracks from track numbers 0 to 7. Track j is the remaining erroneous track so that either (i<j<k) or (j=8 and i<k).

Since Set B in FIG. 6 has only one known track in error, the vertical parity check syndromes $SV_m^b$ yield the error patterns for this track. On eliminating the known 0 value of error patterns corresponding to the error free tracks, then equation (16) can be rewritten as $$SV_m^b = e_m^b(y). \qquad (17)$$

Making the assumption that all errors are corrected up to the (m−1)st byte and the syndrome equations are adjusted for all error patterns, then as is apparent from FIG. 6, the error patterns for the $m^{th}$ position of tracks i, j, and k of Set A can be determined from the diagonal syndromes $Sd_{m+i}^a$ (positive slope) and $Sd_{m+15-k}^b$ (negative slope, and the vertical syndrome $SV_m^a$. The equations for these syndromes may be obtained from equations (13), (14), and (15) upon elimination of the known 0 error patterns corresponding to the error free tracks and the corrected error patterns up to the (m−1)$^{st}$ position in each track. Thus, $$Sd_{m+i}^a = e_m^a(i) \qquad (18)$$

$$Sd_{m+15-k}^b = \begin{bmatrix} e_m^a(k) \oplus e_{m+15-y-k}^b(y), \text{ if } y < 8 \\ e_m^a(k), \text{ if } y = 8 \text{ or } y \text{ is underfined} \end{bmatrix} \qquad (19)$$

$$SV_m^a = e_m^a(i) \oplus e_m^a(j) \oplus e_m^a(k) \qquad (20)$$

From Equation (17) we have $$SV_{m+15-y-k}^b = e_{m+15-y-k}^b(y) \qquad (21)$$

Then equations (18), (19), (20) and (21) yield the error patterns:

$$e_m^a(i) = Sd_{m+i}^a \qquad (22)$$

$$e_m^a(k) = \begin{bmatrix} Sd_{m+15-k}^b \oplus SV_{m+15-y-k}^b, \text{ if } y < 8 \\ Sd_{m+15-k}^b \text{ if } y = 8 \text{ or } y \text{ is undefined} \end{bmatrix} \qquad (23)$$

$$e_m^a(j) = SV_m^a \oplus e_m^a(i) \oplus e_m^a(k) \qquad (24)$$

The $m^{th}$ bits and tracks i, j and k are, then, corrected using these error patterns according the following relations (25), (26), (27):

$$A_m(i) = \hat{A}_m(i) \oplus e_m^a(i) \qquad (25)$$

$$A_m(j) = \hat{A}_m(j) \oplus e_m^a(j) \qquad (26)$$

$$A_m(k) = \hat{A}_m(k) \oplus e_m^a(k) \qquad (27)$$

As may be recalled, the values $A_m(i)$ denote the bit values corresponding to $\hat{A}_m(i)$ as they are read back from the tape.

Prior to the correction of the next position, it is necessary to modify the syndromes affected by these corrections. The modification is shown by an arrow from the previously calculated value of a syndrome with its modification to its new value:

$$Sd_{m+i}^a \leftarrow Sd_{m+i}^a \oplus e_m^a(i) \qquad (28)$$

$$Sd_{m+j}^a \leftarrow Sd_{m+j}^a \oplus e_m^a(j) \quad \text{if } j<8 \qquad (29)$$

$$Sd_{m+k}^a \leftarrow Sd_{m+k}^a \oplus e_m^a(k) \qquad (30)$$

$$Sd_{m+15-i}^b \leftarrow Sd_{m+15-i}^b \oplus e_m^a(i) \qquad (31)$$

$$Sd_{m+15-j}^b \leftarrow Sd_{m+15-j}^b \oplus e_m^a(j) \quad \text{if } j<8 \qquad (32)$$

$$Sd_{m+15-k}^b \leftarrow Sd_{m+15-k}^b \oplus e_m^a(k) \qquad (33)$$

The foregoing correction procedure can be applied to the next bit position by incrementing the value of m by 1.

Two Channel Correction in Set A With Pointers

Errors in two known tracks in Set A can be corrected if Set B has at the most one unknown track or two known tracks in error. The erroneous tracks in Set A are indicated by the channel error pointers i and j where i<j.

If it is assumed that errors are corrected up to the (m−1)$^{st}$ bit position in each track and the syndrome equations are adjusted for all corrected error patterns, then it can be shown that the error patterns for the $m^{th}$ bit positions of tracks i and j of Set A can be determined from the syndromes $Sd_{m+i}^a$ and $Sv_m^a$. The equations for these syndromes can be obtained from equations (13) and (15) respectively. Upon elimination of the known 0 error patterns corresponding to the error free channels and the corrected error patterns up to the (m−1)$^{st}$ position, then the syndromes can be expressed as:

$$Sd_{m+i}^a = e_m^a(i) \qquad (34\text{-}1)$$

$$Sv_m^a = e_m^a(i) \oplus e_m^a(j) \qquad (34\text{-}2)$$

Equations (34-1) and (34-2) yield the error patterns:

$$e_m^a(i) = Sd_{m+i}^a \qquad (35)$$

$$e_m^a(j) = Sv_m^a \oplus e_m^a(i) \qquad (36)$$

The $m^{th}$ bit-positions in tracks i and j are then corrected using these error patterns:

$$A_m(i) = \hat{A}_m(i) \oplus e_m^a(i) \qquad (37)$$

$$A_m(j) = \hat{A}_m(j) \oplus e_m^a(j) \qquad (38)$$

Before proceeding for the correction of the next position, it is necessary to modify the syndromes affected by these corrections as was done in the case of three channels in error. As before, the modification is shown by an arrow from the previously calculated syndrome value to its new value:

$$Sd_{m+i}{}^a \leftarrow Sd_{m+i}{}^a \oplus e_m{}^a(i) \quad (39)$$

$$Sd_{m+15-i}{}^b \leftarrow Sd_{m+15-i}{}^b \oplus e_m{}^a(i) \quad (40)$$

$$Sd_{m+15-j}{}^b \leftarrow Sd_{m+15-j}{}^b \oplus e_m{}^a(j) \quad \text{if } j<8 \quad (41)$$

$$Sd_{m+j}{}^a \leftarrow Sd_{m+j}{}^a \oplus e_m{}^a(j) \quad \text{if } j<8 \quad (42)$$

The foregoing correction can be applied to the next position by incrementing the value of m by 1.

The correction procedure for two known tracks in error is the same as that for three known tracks but for the fact that only two error patterns are calculated from the two local syndromes. Thus, the two track case can be viewed as a special instance of the three track correction procedure.

One Channel Correction in Set A With Pointer

Errors confined to only one known channel in Set A can be corrected by means of only the vertical parity check syndrome of Set A. Under these circumstances, Set B may have up to three known channels in error.

An error pattern for the $m^{th}$ position in only one known track will be indicated by the vertical parity check syndrome $Sv_m{}^a$. If this error occurred in the jth track and the other tracks or channels were error free, then again from equation (15) the following relation obtains:

$$Sv_m{}^a = e_m{}^a(j) \quad (43)$$

Thus, the error pattern is given by the syndrome $Sv_m{}^a$. Track j is then corrected using the error pattern as $$A_m(j) = \hat{A}_m(j) \oplus e_m(j) \quad (44)$$

Before proceeding for the correction of the next position, it is necessary once more to modify the diagonal check syndrome $Sd_{m+j}{}^a$ as it is affected by this correction. The modification is given by $$Sd_{m+j}{}^a \leftarrow Sd_{m+j}{}^a \oplus e_m{}^a(j) \quad (45)$$

The correction for the next position can be performed by incrementing m by 1 and repeating the above procedure.

Once again it may be noted that the correction procedure for the one known erroneous channel can be also implemented as a special case of the correction of three known erroneous channels.

Generation of First Channel-in-Error Pointer And Single Channel Correction in Set A Given No Other Pointers Errors confined to only one unknown channel in Set A can be detected and corrected if Set B has, at most, one unknown or two known channels in error. It is assumed that errors in all channels in Set B are corrected up to the $(m-1)^{st}$ bit position and the syndrome values are adjusted for all corrected error patterns. When all channels in Set A are error free, the parity check syndrome $Sv_m{}^a$ and $Sd_{m+i}{}^a$ are equal to zero for $0<i<7$. When any of these syndromes are found to be non 0, then it is an indication that an error is present in at least one of the channels in the vicinity, within the next 7-bit positions. Assuming that only one erroneous channel is affecting the syndromes, the index of the erroneous track can be determined by examining syndromes $Sd_{m+7}{}^a$ and $Sv_m{}^a$ as the bit position value m progresses. The following statements characterize the generation of first channel-in-error pointer and single channel correction in Set A given no pointers.

Referring now to FIG. 12a, there is shown the generation of a first track error pointer derived from the intersection of a vertical and diagonal syndrome.

Assertion 1

Referring again to FIG. 12a let m and n be the lowest values of bit positions such that m<n and $$Sd_{m+7}{}^a \neq 0 \quad (46)$$

and $$Sv_n{}^a \neq 0 \quad (47)$$

Then track j is in error starting at bit position n and $$j = 7 - (n-m) \quad (48)$$

The value $j<0$ is an indication of an uncorrectable error involving two or more tracks.

Referring now to FIG. 12b, there is shown a generation of a first track error pointer also from the intersection of a vertical and diagonal syndrome where the unknown erroneous track is that of track 8 dedicated to recording vertical parity checks.

Assertion 2

In FIG. 12b, let n be lowest value of bit position such that $$Sv_n{}^a \neq 0 \quad (49)$$

and $$Sd_{m+7}{}^a = 0$$

for all m<n.

Then track 8 is in error starting at bit position n.

The implementation of the above two assertions fits in the general iterative decoding procedure as the bit-position value m is incremented in an iterative manner. A counter will be set to 7 when $Sd_{m+7}{}^a \neq 0$ is detected for the first time. As the bit-position m is incremented forward, the counter will count down each time by one until the bit position n is reached, where $Sv_n{}^a \neq 0$. The resultant count value gives the index of the erroneous track. If the count goes below the value 0, then the error is spread in more than one track and is uncorrectable. If $Sv_n{}^a \neq 0$ is detected first and $Sd_{m+7}{}^a = 0$ even when $m=n$, then the track 8 is in error. The error pattern for the erroneous track can be obtained as usual. The syndromes are always adjusted for the corrected error patterns before incrementing the value of m.

Generation of Second Channel-in-Error Pointer and Two Track Correction in Set A Given One Pointer Consider the case when Set A is being corrected for errors in a known erroneous track and another known track in Set A begins to be affected by errors. This second unknown erroneous track can be detected and both erroneous tracks of Set A can be corrected provided that Set B has at the most one known track in error.

For simplicity, first we will explain the method for the case when tracks 0 to 7 in Set B are error-free. Later it will be easy to see how the equations can be modified to include the effect of a known erroneous track in Set B.

Let j denote the known erroneous track in Set A and we assume that, so far, all remaining tracks in Set A were error free. Also assume that all errors are corrected up to $(m-1)^{st}$ bit-position and the syndrome values are adjusted for all corrected error-patterns.

The error pattern of the $m^{th}$ position of the $j^{th}$ track affects the syndromes $Sd_{m+j}{}^a$, $Sd_{m+15-j}{}^b$ and $Sv_m{}^a$. In the absence of errors in any other tracks, it follows that $$Sd_{m+j}{}^a = Sd_{m+15-j}{}^b = Sv_m{}^a \qquad \text{(A-1)}$$

and the error pattern for the $m^{th}$ position for the $j^{th}$ track is given by $$e_m{}^a(j) = Sv_m{}^a \qquad \text{(A-2)}$$

When any part of the syndrome relationship of Equation (A-1) is violated, it is an indication that an error is present in another track in the vicinity (within the next 15 bit positions). Assuming that only one other erroneous track is beginning to affect the syndromes, the following statements hold.

Assertion 3

Figure 12C:
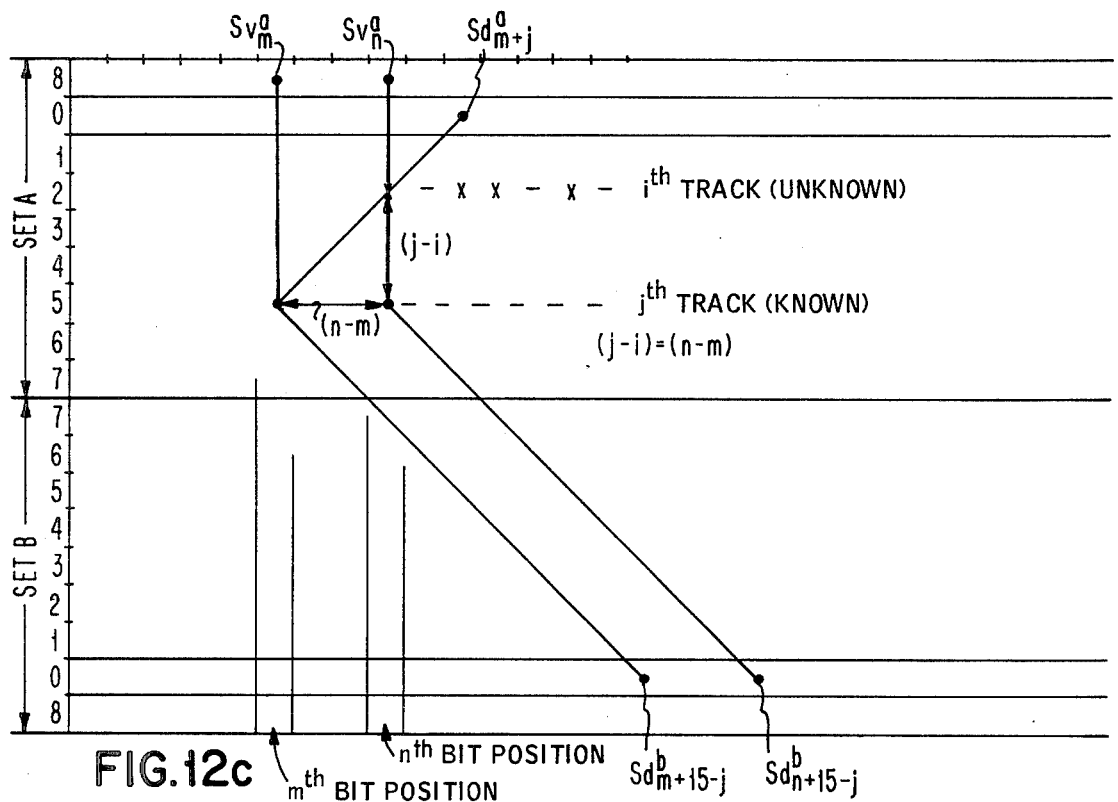
FIG. 12c–f depicts the generation of a second channel-in-error pointer additional to the first pointer in at least one set by means of adaptive usage of the cross parity checks.

With reference to FIG. 12c, let j, (j<8) be the known erroneous track and let m and n be the lowest values of bit positions such that m<n and $$Sd_{m+j}{}^a \neq Sv_m{}^a, \qquad \text{(A-3)}$$

and $$Sd_{n+15-j}{}^b \neq Sv_n{}^a. \qquad \text{(A-4)}$$

then the track i is in error at bit position n and $$i = j - (n-m) \qquad \text{(A-5)}$$

Note that values $i<0$ implies there are more than two unknown erroneous tracks. Furthermore, the error patterns are given by $$e_m{}^a(i) = Sd_{m+i}{}^a \qquad \text{(A-6)}$$

and $$e_m{}^a(j) = Sv_m{}^a \oplus e_m{}^a(i) \qquad \text{(A-7)}$$

Assertion 4

Figure 12D:
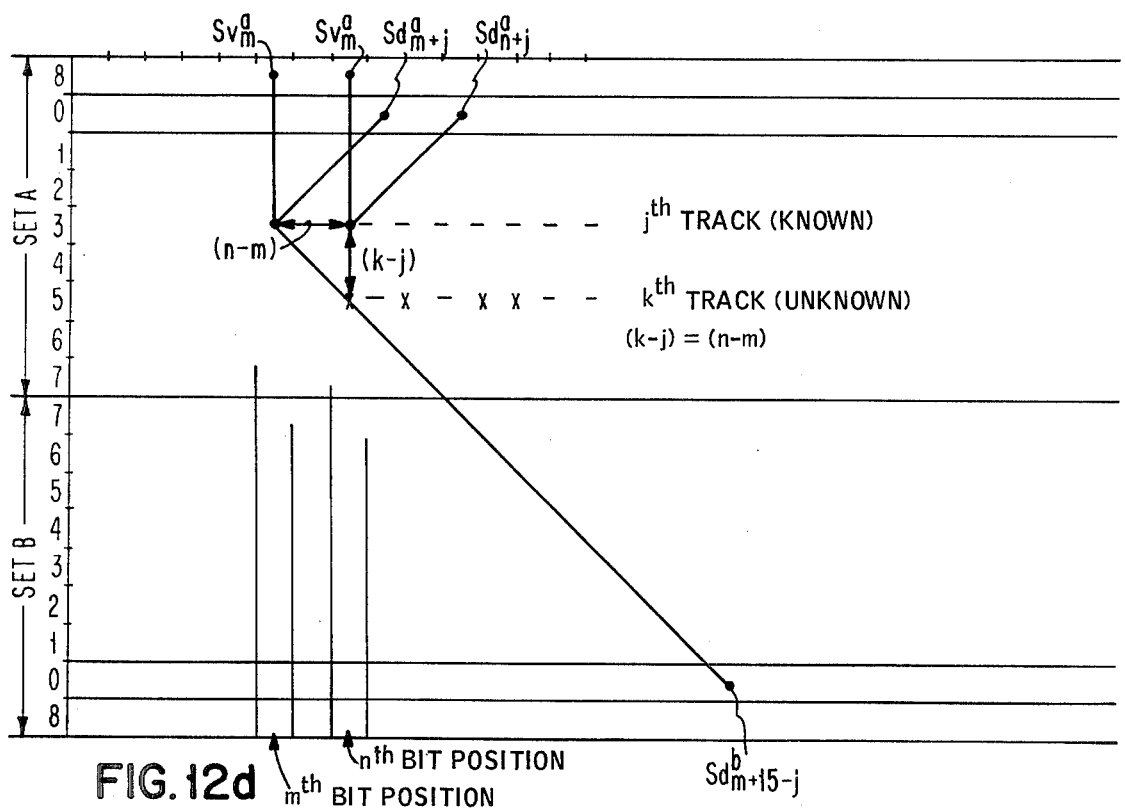

With reference to FIG. 12d, let j, (j<8) be the known erroneous track and let m and n be the lowest values of bit positions such that m<n and $$Sd_{m+15-j}{}^b \neq Sv_m{}^a \qquad \text{(A-8)}$$

and $$Sd_{n+j}{}^a \neq Sv_n{}^a, \qquad \text{(A-9)}$$

then, the track k is in error at bit position n and $$k = j + (n-m). \qquad \text{(A-10)}$$

Furthermore, the error patterns are given by $$e_m{}^a(j) = Sd_{m=j}{}^a \qquad \text{(A-11)}$$

and $$e_m{}^a(k) = Sv_m{}^a \oplus e_m{}^a(j) \qquad \text{(A-12)}$$

The value $k>7$ indicates that the unknown erroneous track is in Set B.

The following Assertions 5 and 6 cover the case when one of the two erroneous tracks is the parity check track 8. Alternatively, track 8 can be included into the computations of the diagonal parity checks and syndromes in which case track 8 will be automatically covered by Assertions 3 and 4.

Assertion 5

Figure 12E:
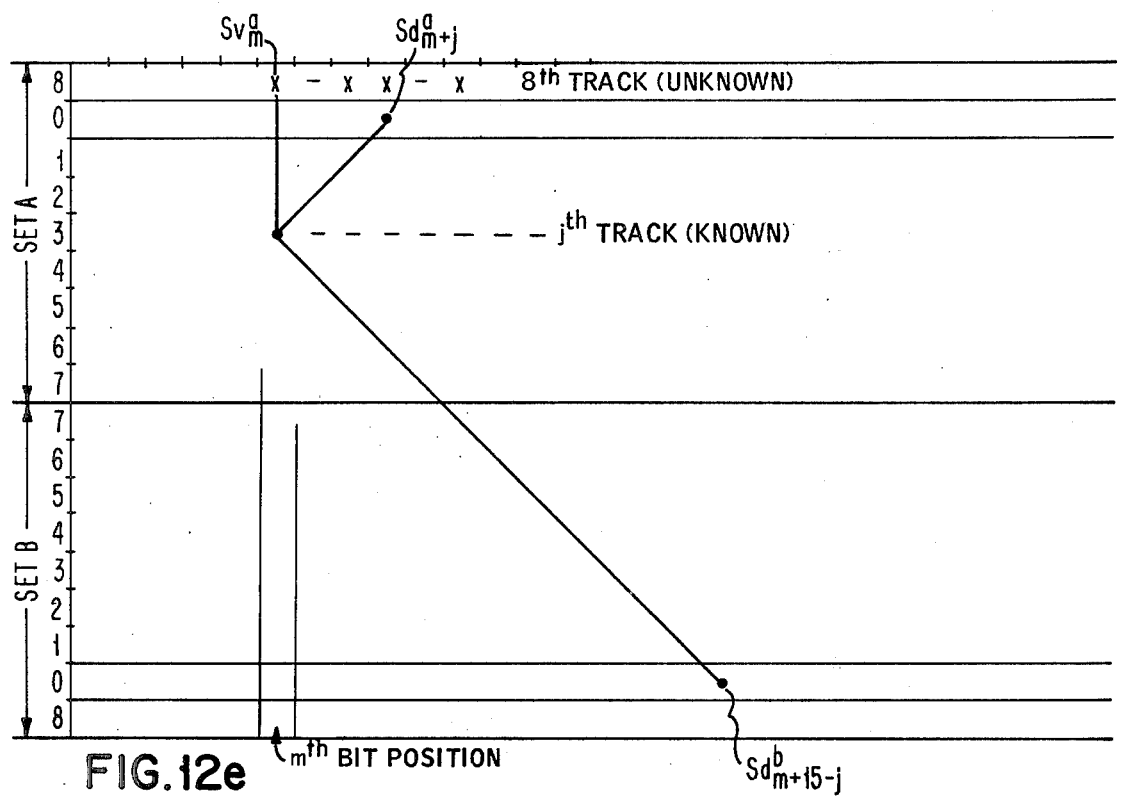

With reference to FIG. 12e, let j (j<8) be the known erroneous track and let m be the lowest value of bit position such that $$Sd_{m+j}{}^a \neq Sv_m{}^a \qquad \text{(A-13)}$$

and $$Sd_{m+15-j}{}^b \neq Sv_m{}^a \qquad \text{(A-14)}$$

then, the track 8 is in error at bit position m. Furthermore, the error patterns are given by $$e_m{}^a(j) = Sd_{m+j}{}^a \qquad \text{(A-15)}$$

$$e_m{}^a(8) = Sv_m{}^a \oplus e_m{}^a(j) \qquad \text{(A-16)}$$

Assertion 6

Figure 12F:
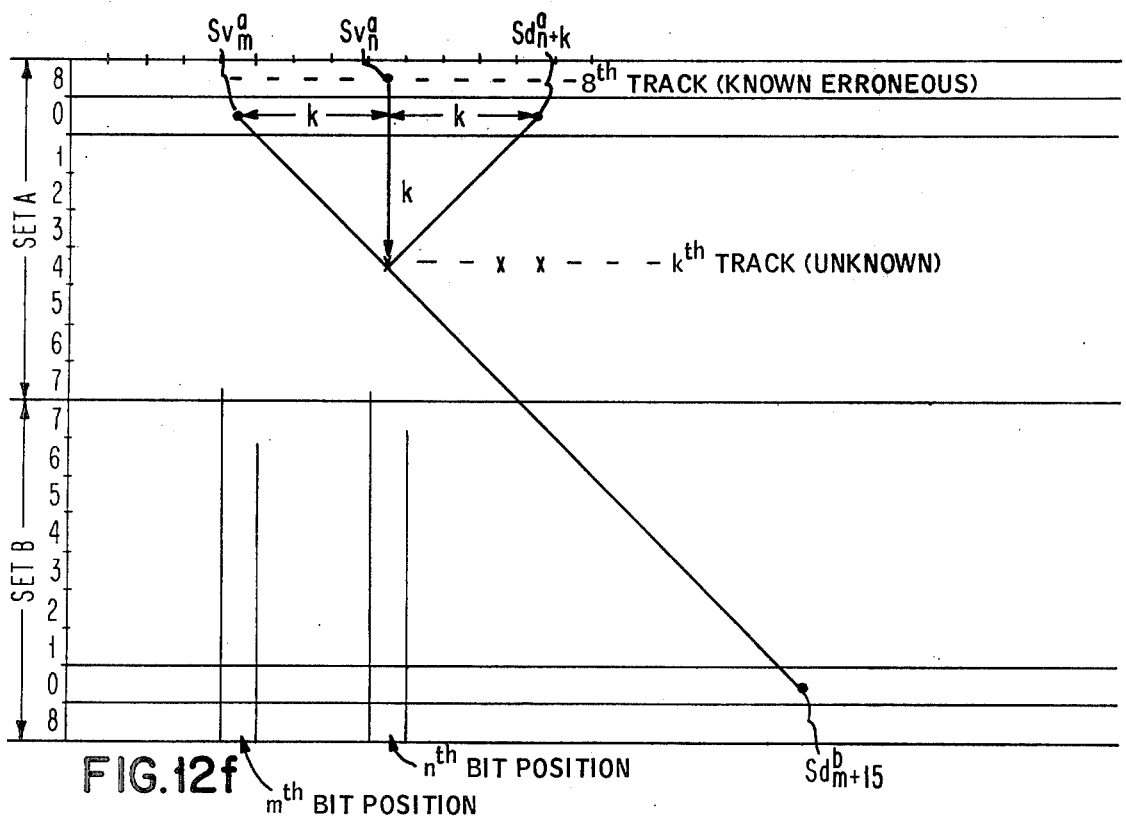

With reference to FIG. 12f, let j (j=8) be the known track in error and let m and n be the lowest values of bit positions such that n=m+k and $$Sd_{m+15}{}^b \neq 0 \qquad \text{(A-17)}$$

$$Sd_{n+k}{}^a \neq 0 \qquad \text{(A-18)}$$

then the track k is in error at bit position n. Furthermore, the error patterns are given by $$e_m{}^a(k) = Sd_{m+k}{}^a \qquad \text{(A-19)}$$

$$e_m{}^a(8) = Sv_m{}^a \oplus e_m{}^a(k) \qquad \text{(A-20)}$$

Note that if $k>7$, then the unknown erroneous track is in Set B. Now we show the modification for the more general case when Set B has at the most one track in error. Let Y, (y<8) be the erroneous track in Set B. The error patterns for this track are all known from the vertical parity check syndrome $Sv_m{}^b$ of Set B. These error patterns also affect the values of diagonal parity check syndromes $Sd_m{}^b$. In order to account for the effect of these error patterns in Assertions 3, 4, 5 and 6 we use the adjusted values $Sd_m{}^b \oplus Sv_{m-y}{}^b$ in place of $Sd_m{}^b$ for any required value of m. In particular, in Assertions 3, 4 and 5 replace $Sd_{m+15-j}{}^b$ by $Sd_{m+15-j}{}^b \oplus Sv_{m+15-j-y}{}^b$ and in Assertion 6, replace $Sd_{m+15}{}^b$ by $Sd_{m+15}{}^b \oplus Sv_{m+15-y}{}^b$.

The proofs of Assertions 3, 4, 5 and 6 follow from the geometrical structure of the code, (FIGS. 12c-f). The implementation fits in the general iterative decoding procedure as the bit position value m is incremented in an iterative manner. An additional counter to count from 0 to 7 will be required to count the value of (n-m) in order to determine the index of the erroneous track. The second equation in each assertion need not be obtained for n greater than m+7. The syndromes are always adjusted for the corrected error patterns before incrementing the value of m.

Note that the effect of the second erroneous track in Set B can be detected in a similar manner. Note also that because of the adaptive usage of the parity check track, the effect of an unknown erroneous track in one set shows up earlier in the other set as a track-error-pointer value larger than 7. (Refer to Assertion 4).

The Decoder Embodiment

Data read from the respective Set A and Set B of tracks are respectively applied over paths 21 and 35 to data distributors 23 and 37 as per FIG. 5. Each data distributor applies to its counterpart error corrector, the bit values as they are read back from the tape. Consequently, data distributor 23 applies $A_m(t)$ over path 49 to corrector 31. At the same time, distributor 37 applies $B_m(t)$ over path 101 to error corrector 45. The error corrections $e_m^a$ from error pattern generator 29 is applied to corrector 31 over path 77. In the same vein, error correction pattern $e_m^b$ from pattern generator 43 is applied to corrector 45 over path 99.

Figure 11:
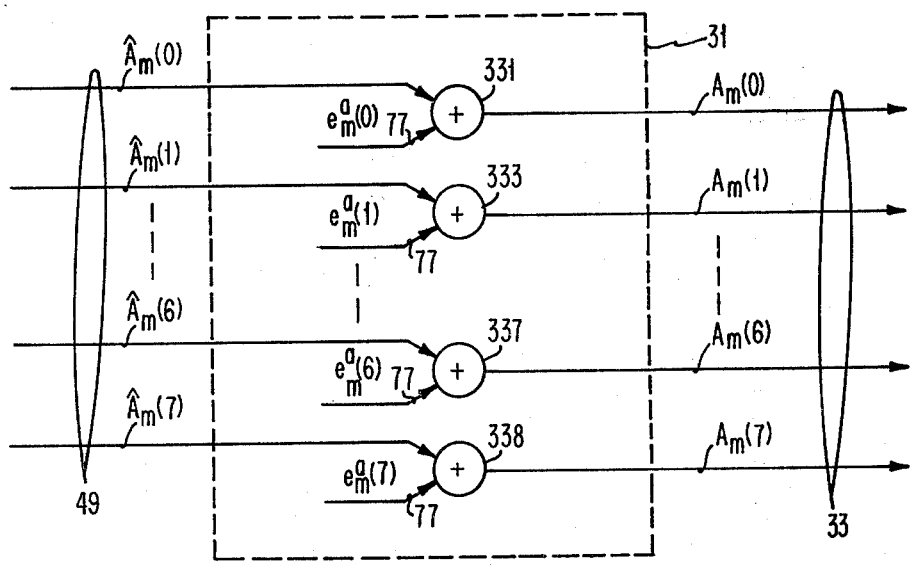
FIGS. 10 and 11 represent the detailed logic respectively of the error pattern generator and the error corrector for set A.

Referring now to FIG. 11, there is shown a typical error corrector 31. The corrector includes a plurality of XOR gates 331, 333, . . . 335, and 337. Each XOR gate terminating a counterpart digit from $\hat{A}_m(t)$ and $e_m^a$. The simultaneous parallel output from the XOR gates is represented as $A_m(0)$, $A_m(i)$, . . . , $A_m(6)$, $A_m(7)$ on the bit lines of path 33. In this regard, the correction represents the logical equivalent of equations (25), (26), (27). The remainder of the description concerns the production of the error correction patterns $e_m^a$ and $e_m^b$ by the syndrome generator 25, processor 27 and error pattern generator 29 for Set A and generator 39, processor 41, and pattern generator 43 for Set B.

Figure 7:
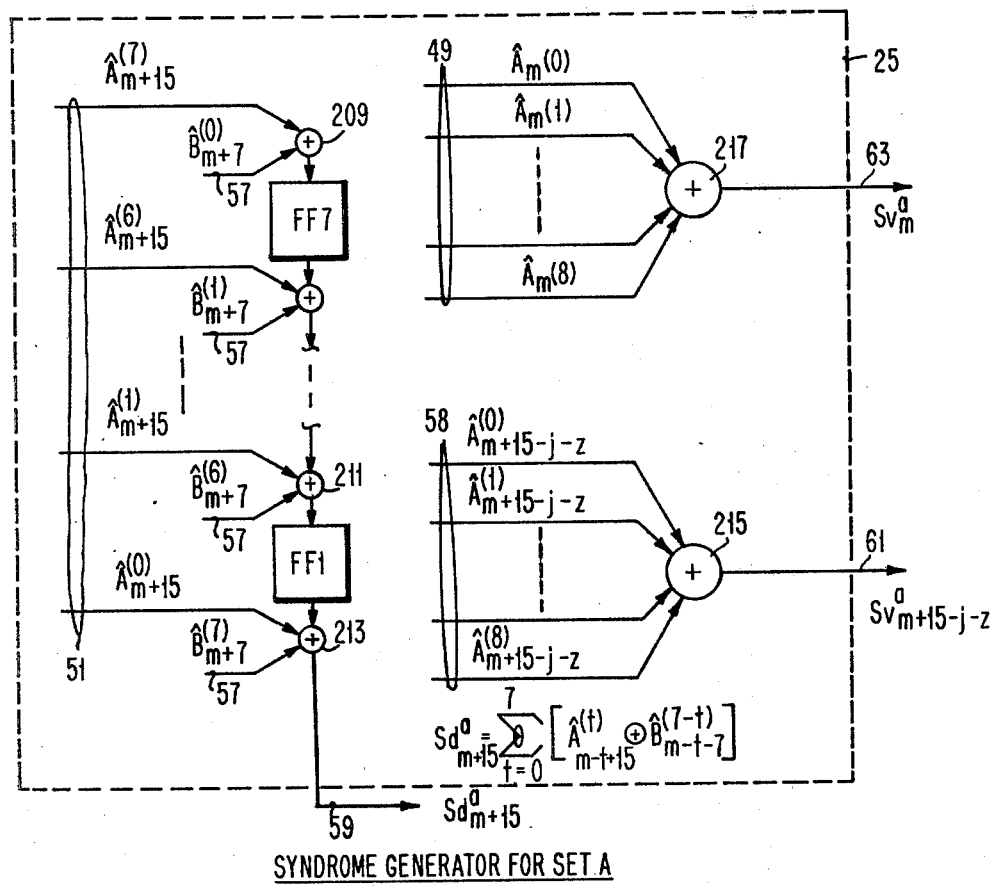
FIG. 7 is a detailed logic representation of the syndrome generator for set A.

Referring now to FIG. 7, there is shown the syndrome generator 25 for Set A. Generator 25 provides on path 63 a vertical parity syndrome $Sv_m^a$ for Set A, a displaced vertical parity syndrome $Sv_{m+15-j-z}^a$ for Set A on path 61 and a displaced cross track or diagonal parity syndrome $Sd_{m+15}^a$ from Set A channels across and including Set B channels on path 59. It should be observed that the vertical parity syndromes are no more than the exclusive ORing of the counterpart bytes respectively read from the $m^{th}$ and the $m+15-j-z$ bit positions of Set A along the tape extent. The input/output relationship for XOR 217 and XOR 215 correspond to equation (9).

The $(m+15)$ th diagonal parity check syndrome on path 59 is obtained from the shift register encoding of $A_{m+15}(t)$ and $B_{m+7}(7-t)$ according to the relation $$Sd_{m+15}^a = \sum_{t=0}^{7} [A_{m+15-t}(t) \oplus B_{m+7-t}(7-t)]$$

corresponding to Equation (7). Here, at the instant of decoder time position m, 8 vertical bits from Set A in the $(m+15)$ th bit position are applied together with 8 vertical bits from Set B in the $(m+7)$ th bit position as taken in inverted order over counterpart paths 51 and 57 as inputs to corresponding XOR gates 204, . . . 211, and 213.

The outputs on path 59 and 61 from generator 25, are in turn applied to syndrome processor 27. The vertical parity syndrome $Sv_m^a$ is forward coupled in processing path for Set A has an input to error pattern generator 29 over path 63. In the processing path for Set B, the signal on path 87 coupling generator 39 to error pattern generator 43 suffices.

Figure 8:
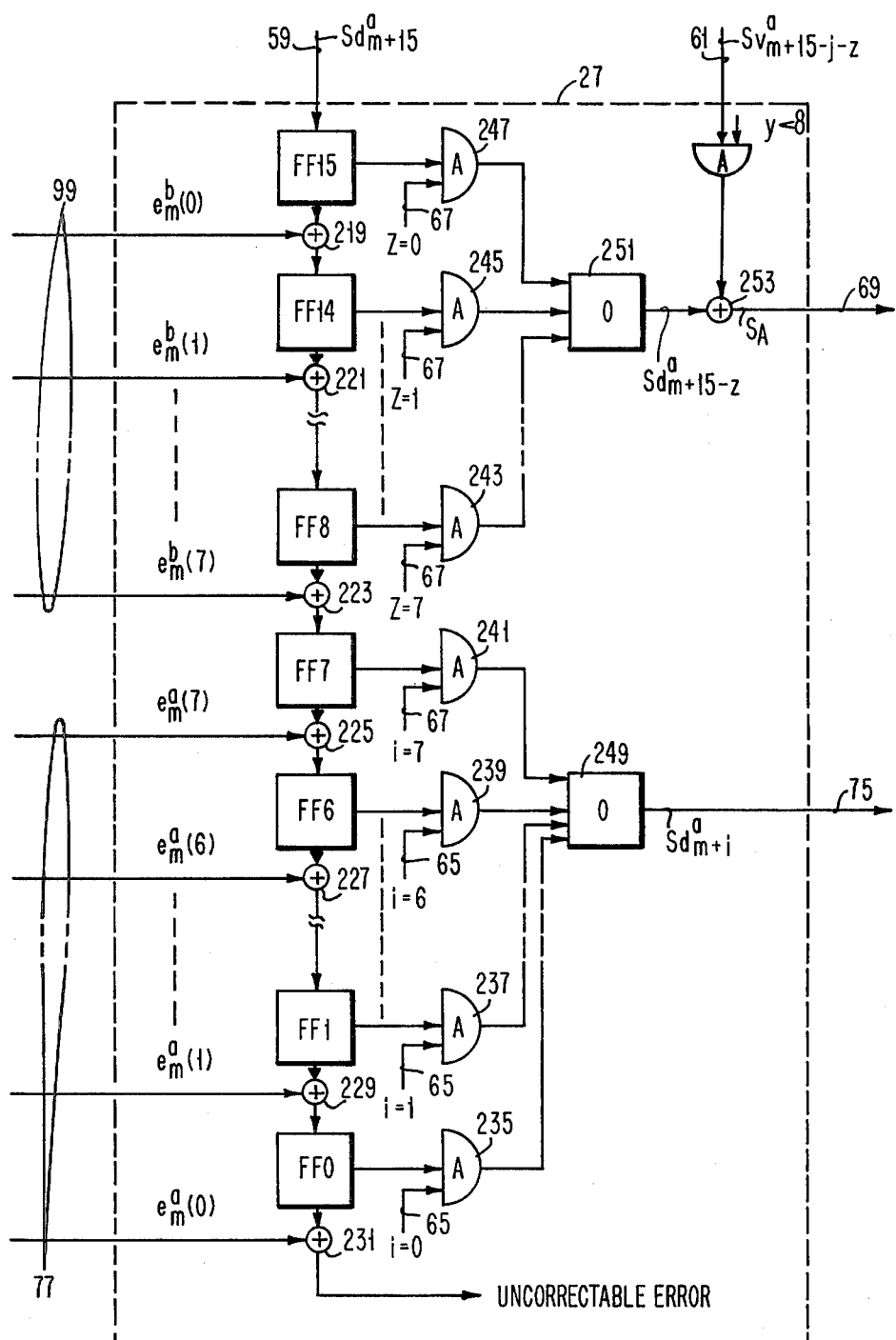
FIG. 8 is the detailed logic for the syndrome processor for set A.
Figure 9:
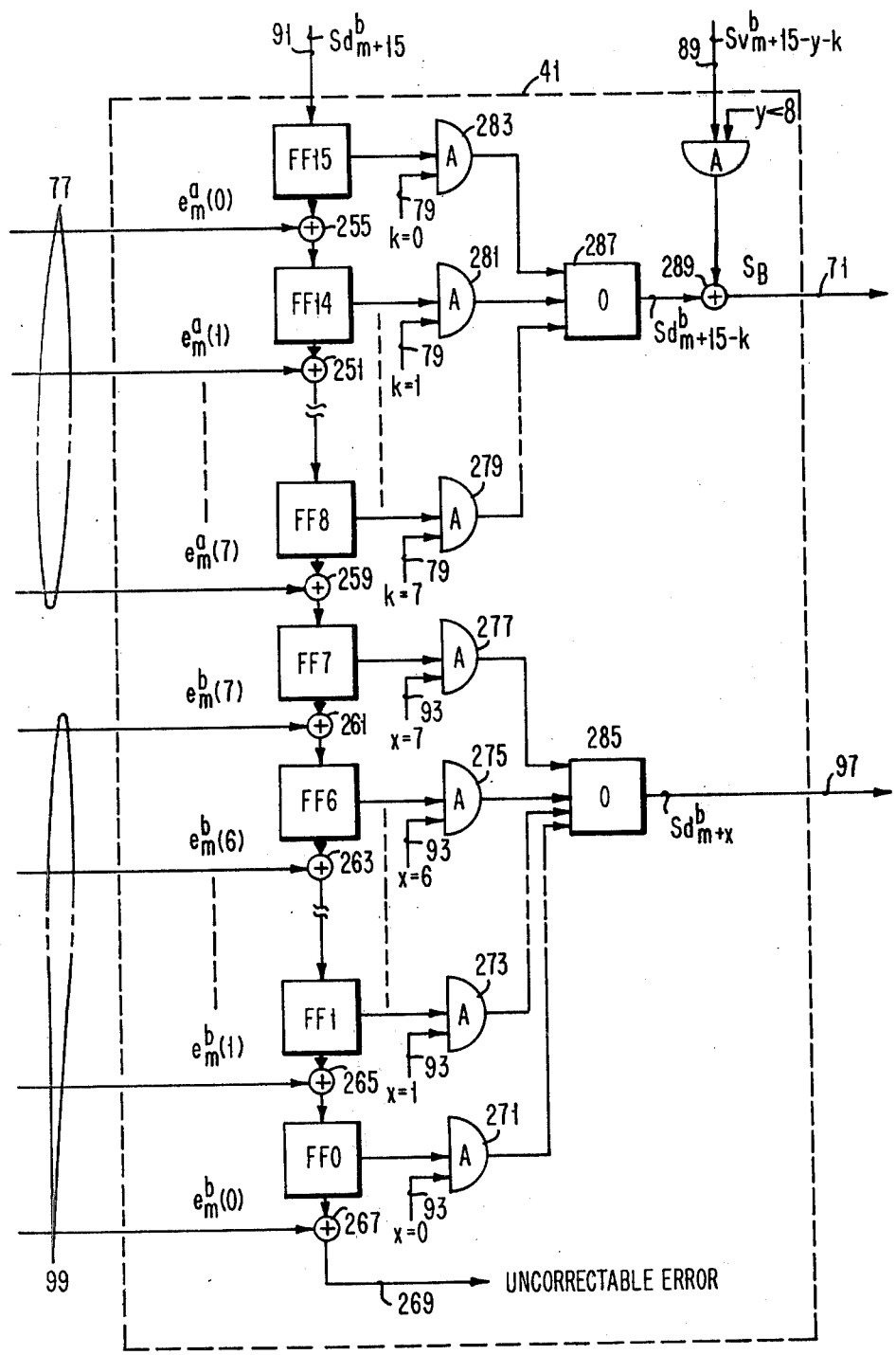

Referring now to FIG. 8, there is shown a logic diagram for syndrome processor 27. The inputs to the syndrome processor are the error correction patterns $e_m^a$ and $e_m^b$ appearing on individual bit lines over paths 99 and 77. Also, the positively sloped diagonal syndrome $Sd_{m+15}^a$ and the displaced vertical syndrome for Set A $Sv_{m+15-j-z}^a$ are respectively applied as an input to shift register stage FF15 and exclusive XOR gate 253. Parenthetically, the output of XOR 253 represents an intersection indicated by $S_A$ of a diagonal syndrome $Sd_{m+15-z}^a$ and a vertical syndrome $Sv_{m+15-j-z}^a$, which intersection covers one of the tracks in Set A. It should be noted that the signal representing the intersection on path 69 is applied as an input to error pattern generator 43 in the Set B processing path. A counterpart signal $S_B$ from syndrome processor 41 indicative of a syndrome intersection located in one of the tracks in Set B is applied over path 71 to error pattern generator 29 in the Set A processing path.

Shift register stages FF15, FF14, FF8, --- FF0 stores all the displaced values from 1 to 15 of the syndrome $Sd_m^a$. The XOR gates 219, 221, --- 223, 225, 227, --- 229, 231 modifies the stored syndrome values in accordance with equations (28)–(33) for the corrected error patterns $e_m^b$ and $e_m^a$ of the previous cycle as the syndrome values are displaced into their new positions and the new cycle begins for the next in position.

Shift register stages FF15, FF14, . . . FF8 in which the input into all stages but the first is the modulo 2 edition of the shift register stage contents and the error correction pattern $e_m^b$. Since AND gates 247, 245, . . . , 243 have a pointer indication (z) on path 67 as to the location of a channel in error in Set B, then the syndrome $Sd_{m+15-z}^a$ from OR gate to 51 represents the positively sloped diagonal syndrome intersecting the channel in error in Set B yielding its calculated value.

All displaced values from 1 to 15 of the diagonal syndrome $Sd_m^a$ are made readily available by means of the shift register logic of stages FF7, FF6, . . . , FF1, FF0; the associated AND gates 241, 239, 111, 237, 235 and OR gate 249 select out the $i^{th}$ displaced value $Sd_{m+i}^a$ as required for equations (18) and (22). The XOR gates 225, 227, . . . , 229, 231 modify the stored syndrome values by means of the corrected error patterns $e_m^a$ from the previous cycle as the syndrome values are displaced into their new positions. Also, a mismatch between the contents of a register position FF0 and $e_m^a(0)$ both inputting to XOR gate 231, indicates the presence of an uncorrectable error on path 233.

Figure 10:
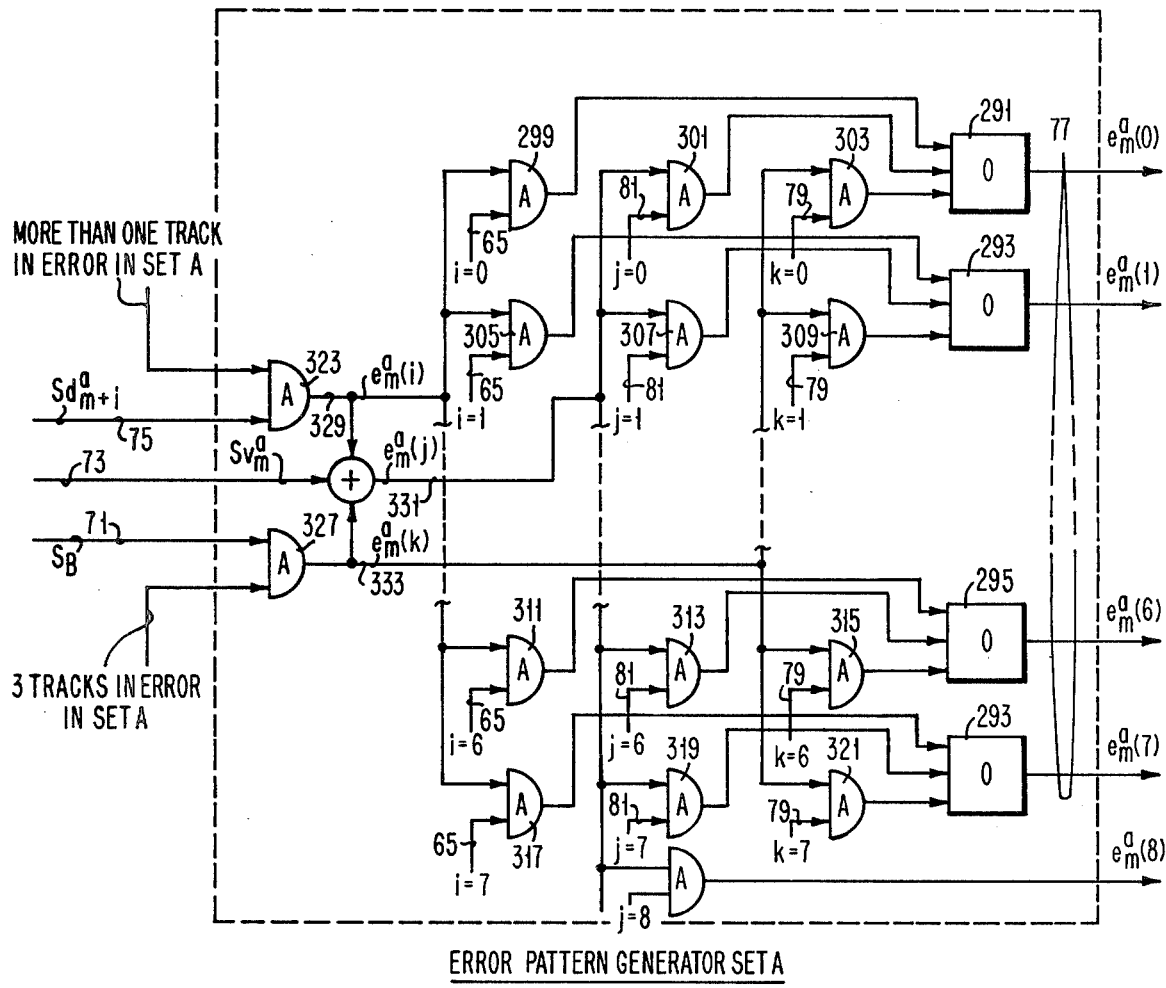

Referring now to FIG. 10, there is shown error pattern generator 29 for Set A. The output corrective error pattern for Set A appears on the corresponding bit lines of path 77 as $e_m^a(0)$, $e_m^a(1)$, . . . , $e_m^a(7)$, $e_m^a(8)$. Each of the OR gates 291, 293, . . . , 295, and 297 terminate corresponding AND gates from a series of AND gates. For example, OR gate 291 terminates AND gates 299, 301, and 303. AND gate 299 is from the series of AND gates 299, 305, . . . , 311, and 317; AND gate 301 is from the series 301, 307, . . . , 313, and 319; AND gate 303 is from the series 303, 309, . . ., 315, and 321. Now when one or more of the pointers i, j, or k are active, then an appropriate "1" appears on paths 65, 81, or 79. If track 1 in Set A were erroneous and i was the pointer thereto, then the i=1 conductor of path 65 terminating in AND gate 305 would be activated. When "more than one track in error" is activated, the diagonal error syndrome $Sd_{m+i}^a$ on path 75 passes through AND 323. This is the value of error pattern $e_m^a(i)$ according to Equation (22). The signal $e_m^a(i)$ on path 329 is distributed as one of the inputs to all of the AND gates of the series 299, 305, . . ., 311, and 317. Given that only i=1 conductor on path 65 is activated, then the signal $e_m^a(i)$ passes through AND gate 305, through OR gate 293 on that conductor of path 77 designated $e_m^a(1)$.

If three tracks are in error in Set A then the AND gate 327 is activated and the composite syndrome $S_B$ on path 71 passes through. This is the value of error pattern $e_m^a(k)$ according to Equation (23). The signal on path 333 is distributed as one of the inputs to all of the AND gates of the series 303, 309, 315, 321. The signal $e_m^a(k)$ passes through one of the AND gates depending on the value of k. For example, if $k=7$ then the AND gate 321 is activated and the signal $e_m^a(k)$ passes through AND gate 321 through OR gate 297 and appears as $e_m^a(7)$ on the corresponding conductor of path 77.

Now a vertical parity syndrome $Sv_m^a$ from syndrome generator 25 over path 73 interacts with the error patterns $e_m^a(i)$ and $e_m^a(k)$ through the XOR gate 325, according to Equation (24). The output of the XOR gate 325 is then the value of the error pattern $e_m^a(j)$ on path 331. The signal on path 331 is distributed as one of the inputs to all of the AND gates of the series 301, 307, 313, 319, 325. The signal $e_m^a(j)$ passes through one of these AND gates depending on the value of j. For example, if $j=6$ then the AND gate 313 is activated and the signal $e_m^a(j)$ passes through AND gate 313 through OR gate 295 and appears as $e_m^a(6)$ on the corresponding conductor of path 77. Note that the values of pointers i, j and k satisfy the relation $(i<j<k)$ or $(j=8$ and $i<k)$.

Referring again to FIG. 6, where three channels in error i, j, and k, representing tracks 2, 4, and 5 in Set A and pointer y indicative of track 3 in error in Set B are shown. It is clear that the error value for the vertical parity syndrome $Sv_m^a$ is ambiguous as to whether the bit in error is on any of the tracks 2, 4 or 5. This ambiguity is resolved if recourse is made to that diagonal parity error syndrome which crosses the least number of tracks in error. Thus, a negatively sloped diagonal syndrome such as $Sd_{m+15-k}^b$ terminating in track 0 of Set B some 3 positions to the right while intersecting the $m^{th}$ bit position in error in track 2 of Set A would nevertheless have to cross 3 other tracks in error. These tracks would be namely track 3 in Set B and tracks 5 and 4 in Set A. The diagonal parity syndrome crossing the fewest number of tracks would be a syndrome terminating in track 0 of Set A positively sloped and terminating at bit position $m+2$. It is designated $Sd_{m+i}^a$.

The diagonal parity syndrome for identifying the error in track 5 of Set A at the $m^{th}$ bit position would also be negatively sloped and terminating in track 0 of Set B and designated by $Sd_{m+15-k}^b$. In contrast, a positively sloped diagonal error syndrome terminating in track 0 of Set A would intersect one more track in error than the negatively sloped diagonal. Since this latter diagonal may also intercept an erroneous track in Set B advantage must be taken of the vertical parity $Sd_{m+15-y-k}^a$ terminating in track 8 of Set B. This provide discriminating value. It is only after the values for the i and k tracks have been ascertained that attention is directed to the intermediate j track. To recapitulate, first we removed the unknown error value of track i. This was followed by the removal of the unknown value in track k. It now becomes possible to discern whether there is an error in the track 4 by the vertical syndrome $Sv_m^a$.

Embodiment of Generation of First and Second Error Pointers

Figure 13A:
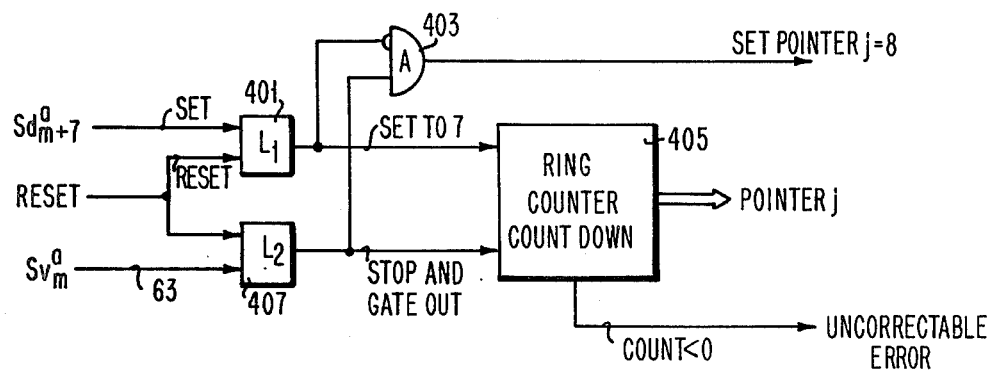
FIG. 13a represents the detailed logic for the generation of a first channel-in-error pointer in Set A.

Referring now to FIG. 13a, there is shown a first error pointer generator for obtaining an index of the first erroneous channel in Set A in the absence of any pointer. It is understood that Set B has, at most, two known tracks in error. The generator comprises a pair of latches 401 and 407 respectively starting and stopping a count-down ring counter 405. The output of the ring counter 409 represents pointer j. The latches 401 and 407 are respectively responsive to syndromes $Sd_{m+7}^a$ and $Sv_m^a$. When $Sd_{m+7}^a=1$ then latch 401 is set and the count in counter 405 is set to 7. For each change in the bit position m along the track, the counter is decremented by 1. In contrast, when $Sv_m^a=1$ then latch 407 is set and counter 405 is stopped. The value of the counter at this juncture constitutes the pointer j. For the special case when latch 407 is set before latch 401, then, the pointer index j is equal to 8.

Referring now to FIG. 13b, there is shown a second error pointer generator for Set A when the first pointer is directed to a track other than 8. A generator comprises a pair of ring counters 405 and 406 respectively outputting at ports 415 and 417 pointer i and pointer j. Latch 401 sets ring counter 405 of the count-down type to the value j while latch 407 sets ring counter 406 of the count-up type also to value j. Stop and gate out signals are provided over a common path to both ring counters when AND gate 413 is actuated by both latches being set. Relatedly, the output 427 of AND gate 411 indicates the setting of second pointer to the value $j=8$ only upon the simultaneous mismatch of inputs to XOR gates 423 and 425. In the latter sense, a mismatch of inputs $Sd_{m+i}^a$ and $Sv_m^a$ on paths 75 and 63 to XOR gate 423 sets latch 401 while a mismatch of inputs $Sv_m^a$ and $S_B$ on paths 63 and 71 to XOR gate 425 sets latch 407.

The embodiment in FIG. 13b should be taken together with the format shown in FIG. 12c, d and e. Operation can be understood, if it is appreciated that one is given a pointer $j<8$ in Set A. Initially, i and j are set equal to each other and value k such that $i=j=k$. The object is to obtain a second pointer and reassign values such that $i<j$, where Set B has, at the most, one known track in error. In other words, one pointer $j<8$ in Set A, and at most, one pointer in Set B are the required conditions to activate this generator.

Now the input $S_B$ on path 71 represents $Sd_{m+15-k}^a \oplus Sv_{m+15-k-y}^b$ for $k=j$. Upon the condition that $Sd_{m+i}^a \neq Sv_m^a$ for $i=j$ then a 1 output from XOR gate 423 sets latch 401. This in turn, sets counter 405 to the value j. Likewise, when $S_B \neq Sv_m^a$ then a 1 through XOR gate 425 sets latch 407 and counter 406 to value j. As m is incremented by 1, then counter 405 decrements by 1 and counter 406 increments by 1. However, if both latches 401 and 407 are set, the counters stop by way of a signal passing through AND gate 413. At this juncture pointer i is equal to the count in counter 405 while pointer j is equal to the count in counter 406. The special case when the latches 401 and 407 are simultaneously set at the same value of m, then sets the second pointer index $j=8$.

Referring now to FIG. 13c there is shown a second error pointer generator for Set A when the first error pointer is on track 8. The object is to obtain a second pointer i given first pointer $j=8$. Initially, set $i=k=0$. Set B has, at most, one known track in error. The generator comprises a ring counter of the count-up type 406 set to 0 by latch 423 and stopped with the contents gated out by syndrome $Sd_{m+i}^a$ on path 75. Latch 423 is set when $S_B$ is 1 while the counter is stopped when the syndrome driving path 75 is 1.

Initially, i and k are set to 0. $S_B$ represents $Sd^b_{m+15-k} \oplus Sv^y_{m+15-l-y}$ where k=0. $S_B=1$ sets the counter to 0. The counter increments by 1 as m is incremented by 1. In this case, k remains 0 whereas i follows the value of the counter. Notably, $Sd_{m+i}{}^a$ equal to 1 stops the counter and the count is equal to the pointer index. Note that as pointed out in FIG. 12f, one pointer set to j=8 in Set A, and at most one pointer in Set B are the required conditions to activate this generator.

Error Correction In Set B

The previously described error correction method steps and pointer generation steps possess a built-in mirror-image symmetry around Set A and Set B. In particular, the encoding and decoding equations for Set B can be obtained from those of Set A by substitution of appropriate variables, namely:

$$A_m \longleftrightarrow B_m \quad i \longleftrightarrow x$$
$$Sd^a_m \longleftrightarrow Sd^b_m \quad j \longleftrightarrow y$$
$$Sv^a_m \longleftrightarrow Sv^b_m \quad k \longleftrightarrow z$$
$$e^a_m \longleftrightarrow e^b_m$$

Thus, the following types of errors are correctable in Set B by applying the decode process as described for Set A.

1. Up to three known erroneous tracks in Set B when Set A is error-free or has only one known track in error.
2. Up to two known erroneous tracks in Set B when Set A has at the most one unknown or two known erroneous tracks.
3. Up to one known erroneous track in Set B independent of Set A.
4. Up to one unknown erroneous track in Set B when Set A has at the most one unknown track or two known tracks in error.
5. Up to two erroneous tracks in Set B (one of which is known) when Set A has only one known track in error.

The General Case

Thus far, attention has been focused on the case of two sets of 9 tracks in an 18-track system. However, the result may be generalized into a system with any number of tracks in which the two sets may not have equal number of tracks. Set forth below are the encoding equations for such a system.

If Set A has $(T_1+2)$ tracks and Set B has $(T_2+2)$ tracks, then encoding equations (3), (4), (5) and (6) can be rewritten for this general case as $$\sum_{t=0}^{T_1} O\, A_{m-t}(t) \oplus \sum_{t=0}^{T_2} O\, B_{m-t-T}(T_2 - t) = 0 \quad (50)$$

$$\sum_{t=0}^{T_2} O\, B_{m-t}(t) \oplus \sum_{t=0}^{T_1} O\, A_{m-t-T_2}(T_1 - t) = 0 \quad (51)$$

$$\sum_{t=0}^{(T_1+1)} O\, A_m(t) = 0 \quad (52)$$

$$\sum_{t=0}^{(T_2+1)} O\, B_m(t) = 0 \quad (53)$$

The decoding equations can be formulated for the general case in a similar manner. If $T_2$ is not equal to $T_1$, the decoding equations still remain substantially similar for Set A and Set B which allows the use of same decoding hardware for the two sets by time-multiplexing the decoding process. One effect of increased number of tracks is the fact that the encoding and decoding processes involve corresponding number of bit-positions along the tracks. This, in turn, determines the size of the encoding and decoding buffers and processing time delay. Another effect of the increased number of tracks is the corresponding increase in the number of additional check bits at the end of the record in order to complete the two diagonal parity checks. In general, the two diagonal check tracks will be extended by $T_1+T_2$ additional positions.

Adaptive Use of Cross Parity Checks in A System Having 3 or More Sets of Channels Heretofore there has been described a parallel multichannel data handling system in which the channels of the system were divided into mutually exclusive sets and the channel errors in these sets were corrected by means of cross parity checks and vertical parity checks. By means of adaptive usage of these parity checks, it was shown that up to 3 known erroneous channels could be corrected in any one of the sets provided that the number of erroneous channels in the two sets together did not exceed four.

Referring now to FIG. 14, there is shown a format using vertical and diagonal parity checks with 3 sets of channels. In this regard, let $T_1$, $T_2$, $T_3$, denote the number of data channels in Set A, Set B, and Set C, respectively. Each set will have its own vertical parity check channel. Two additional check channels or tracks will provide overall parity checks along the diagonal with positive slope and along the diagonal with negative slope, both encompassing all data tracks. The total number of channels in the system is $2+(T_1+1)+(T_2+1)+(T_3+1)$.

The parity check along the diagonal with positive slope in FIG. 13 is designated $d_m+$check, and is recorded in the 0th track on the side of the first set. The corresponding encoding equation is given by $$A_m(0) = \sum_{t=1}^{T_1} O\, A_{m-t}(t) \oplus \sum_{t=1}^{T_2} O\, B_{m-t-T_1}(t) \oplus \sum_{t=1}^{T_3} O\, C_{m-t-T_1-T_2}(t) \quad \text{(B-1)}$$

The parity check along the diagonal with negative slope termed the $d_m-$ check, is also recorded in the 0th track but on the side of the last set (Set C). Its corresponding encoding equation is given by $$C_m(0) = \sum_{t=1}^{T_3} O\, C_{m-t}(T_3 - t) \oplus \sum_{t=1}^{T_2} O\, B_{m-t-T_3}(T_2 - t) \oplus \sum_{t=1}^{T_1} O\, A_{m-t-T_2-T_3}(T_1 - t) \quad \text{(B-2)}$$

The vertical parity check is recorded in a separate check track for each set. Its corresponding encoding equations are $$A_m(T_1 + 1) = \sum_{t=1}^{T_1} O\, A_m(t) \quad \text{(B-3)}$$

$$B_m(T_2 + 1) = \sum_{t=1}^{T_2} O\, B_m(t) \quad \text{(B-4)}$$

-continued $$C_m(T_3 + 1) = \sum_{t=1}^{T_3} O\, C_m(t) \quad \text{(B-5)}$$

These parity checks provide the following error correction capability.

1. The vertical parity check in each set provides correction of one known erroneous track in that set.
2. The vertical parity check of a set in conjunction with one of the two diagonal parity checks provides correction of two known erroneous tracks in that set.
3. The vertical parity check of a set in conjunction with one of the two diagonal parity checks provides detection and correction of one unknown erroneous track in that set.
4. The vertical parity check of a set in conjunction with both the diagonal parity checks provides correction of up to three unknown erroneous tracks in that set.
5. The vertical parity check of a set in conjunction with both the diagonal parity checks provides correction of one known and one unknown erroneous tracks in that set.

Each of the two diagonal checks can aid the error detection and/or correction in one set only. Thus, the error correction capability as described in (4) and (5) above is available to any one set only. Similarly, the error correction capability as described in (2) or (3) above is available to any two sets only.

The decoding equations and their implementation can be derived by considering various channel-in-error combinations as was illustrated in the two logically independent sets of channels.

While the invention has been particularly shown and described with reference to a preferred embodiment thereof, it will be understood by those skilled in the art that various changes in form and detail may be made therein without departing from the spirit and scope of the invention. In particular, the function described herein can be easily implemented with programmable logic arrays and/or software means without departing from the spirit and scope of the invention.

While the invention has been particularly shown and described with reference to a preferred embodiment thereof, it will be understood by those skilled in the art that various changes in form and details as hereinbefore described may be made therein without departing from the spirit and scope of the invention.

What is claimed is:

1. In combination: a parallel multi-channel data handling system (FIG. 1-3, 5, 7), the channels (FIG. 6) being partitioned into a first and second set; means for ascertaining channels in error externally and generating pointer signals (i,j,k,x,y,z); and apparatus (9, 19) for correcting up to three channels in error in any one set, the other set having no more than one channel in error; said apparatus comprising:

means (9) for encoding and writing into a first channel in each set vertical parity checks limited to that set;

means (9, 193–207, FF1–FF7) for encoding and writing into a second channel of each set parity checks taken over both sets of channels in a predetermined positively or negatively sloped direction;

means (25, 27, FIGS. 7 and 8) for determining syndromes ($Sv_m^a$, $Sv_m^b$, $Sd_{m+i}^a$, $Sd_{m+x}^b$, $S_A$, $S_B$) from the parity checks and data written into the channels;

means (29, FIG. 10) responsive to the external pointer signals designating at least one known channel in error for generating correction signals ($e_m^a$, $e_m^b$) from at least two syndromes intersecting the same error in the known error channel; and means (31, FIG. 11) for correcting said errors by logically combining the correction signals ($e_m^a$, $e_m^b$) with the original known channel data ($A_m$, $B_m$).

2. In a parallel multichannel data handling system according to claim 1, wherein said apparatus further comprises:

means (401, 407, 405, 406, FIG. 13b) responsive to the syndrome determining means (25) for generating an internal pointer (415, 417) to an unknown channel in error (channel I-FIG. 12c, channel K-FIG. 12d) in the first set having a first known channel in error (channel J FIGS. 12c&d) and the remaining set having one known channel in error.

3. In a parallel multi-channel data handling system according to claim 1, wherein of the two intersecting syndromes, one of which is a diagonal syndrome.

4. In a parallel multi-channel data handling system according to claim 1, wherein said means for generating correction signals include means for selecting as between two diagonal syndromes the one closest to the channel in error.

5. In a parallel multi-channel data handling system according to claim 1, wherein the means for generating correction signals includes means for modifying the diagonal check syndrome by logically combining said syndrome with the correction signal in the same manner as the correction signal is combined with the original channel data.

6. In combination: a parallel muti-channel data handling system, the channels being partitioned into a first and second set; means for ascertaining channels in error externally and generating pointer signals thereto (i,j,k,x,y,z); and apparatus for correcting up to three channels in error in any one set, the other set having no more than one channel in error; said apparatus comprising:

means (9, 193–207, FF1–FF7, FIGS. 2-4) for encoding and writing into a first channel in each set vertical parity checks limited to that set and for encoding and writing into a second channel of each set parity checks taken over both sets of channels in a predetermined positively or negatively sloped direction;

means (25, 27, FIGS. 7,8) for determining syndromes from the parity checks and data written into the channels;

means (423, 425, FIG. 13b) for detecting mismatches between the vertical and diagonal syndromes intersecting the same error (FIGS. 12C,D) in a known error channel, one syndrome intersecting an unknown error channel; and means (401, 407, 405, 406) responsive to an external pointer (i,j) designating a known error channel in the first set and to the detected mismatches for generating an internal pointer to the unknown error channel in the same set as a function of the displacement between the first and a subsequent mismatch.

7. In a parallel multi-channel data handling system according to claim 6, wherein the means for generating an internal pointer includes:

a counter initialized to the number of the known channel in error;

means for selectively incrementing or decrementing said counter; and logic means coupling the syndrome determining means for causing the incrementing means to change the counter value such that if a near or far diagonal syndrome is unequal in the first mismatch then the counter is incremented until a vertical syndrome is detected as being unequal in a second mismatch.

8. In a parallel multi-channel data handling system according to claim 7, wherein the means for generating an internal pointer includes:

means for pointing to the first redundant channel if the vertical syndrome is unequal in the first syndrome mismatch.

9. In combination with a paralled multi-channel data handling system, the channels being partitioned into a plurality of logically independent sets of channels including a set of common channels; means for ascertaining channels in error externally and generating pointer signals thereto; an apparatus for correcting up to three channels in error in any one set, there being no more than one other channel in error in the aggregate of the other sets; said apparatus comprising:

means for encoding in a first channel in each set other than the common set, vertical parity checks limited to that set;

means for encoding respectively in a first and second channel of the common set parity checks taken over all of the sets of channels respectively in a predetermined positively or negatively sloped direction;

means for determining syndromes from the parity checks and data recorded in the channels;

means responsive to external pointer designating known channels in error for generating correction signals from at least two syndromes intersecting the same error in the known channel; and means for correcting said errors by logically combining the correction signals with the original channel data.

10. In an apparatus for encoding and writing of data into a plurality of parallel channels, said channels being partitioned into logically independent sets, the combination comprising:

means for encoding and writing into a first channel of each set vertical parity checks limited to that set; and means for encoding diagonal parity checks taken over all of the channels in a predetermined positively or negatively sloped direction and writing said encoded diagonal parity checks in a format selected from the group consisting of bits written in a second channel in each set, and regularly spaced bytes written in the cross-channel direction.

11. In an apparatus for decoding data written into a plurality of parallel channels, means for ascertaining channels in error externally and generating pointer signals thereto, said channel plurality being partitioned into logically independent sets, a first channel of each set containing vertical parity checks limited to that set, diagonal parity checks taken over all channel sets in a predetermined positively or negatively sloped direction being formatted from one of a group consisting of bits written into a second channel in each set, and regularly spaced bytes written in the cross-channel direction; the combintion comprising:

means for determining syndromes from the parity checks and data written into the channels;

means for detecting mismatches between the vertical and diagonal syndromes intersecting the same error in a known error channel, one syndrome intersecting an unknown error channel; and means responsive to an external pointer signal designating a known error channel in a first set and to the detected mismatches for generating an internal pointer to an unknown error channel in the first set as a function of the displacement between the first and subsequent vertical and diagonal syndrome mismatch, the number of channels in error in any one set not exceeding three while the aggregate of channels in error cannot exceed four.

12. In an apparatus for decoding data written into a plurality of parallel channels, said channel plurality being partitioned into logically independent sets, a first channel of each set containing vertical parity checks limited to that set, diagonal parity checks taken over all channel sets in a predetermined positively or negatively sloped direction, said diagonal parity checks being formatted from one of a group consisting of bits written into a second channel in each set, and regularly spaced bytes written in the cross-channel direction; the combination comprising:

means for determining syndromes from the parity checks and data written into the channels; and means (401, 407, 405, FIG. 13a) responsive to vertical (63) and diagonal (75) syndromes intersecting the same error (FIGS. 12a, b) for generating a first channel in error pointer (504, pointer j) as a function of the bit position displacement in the in-channel direction between the vertical and diagonal checking bit positions, the errors being confined to only one unknown channel in the first set and at most two channels in the second set.

13. In an apparatus according to claim 12, wherein the channel pointer means includes a free-running ring counter of the count-down type;

first means responsive to the occurrence of a diagonal syndrome for setting the ring counter to a predetermined value; and second means responsive to the occurrence of a vertical syndrome for inhibiting the ring counter and gating out its contents.

14. In an apparatus for decoding data according to claim 12, wherein the means for generating a pointer to an unknown error channel responsive to a pointer designating a known error channel includes a first and second free running cyclic counter, said first counter being of the count-down type while the second counter being of the count-up type; and means responsive to the external pointer for setting both counters to a value indicative of the known channel in error, the counters respectively being decremented or incremented each time the bit position along the channel changes until a vertical syndrome is detected as not being equal to the other syndromes in the first set.

* * * * *

UNITED STATES PATENT OFFICE
CERTIFICATE OF CORRECTION

PATENT NO. : 4,201,976
DATED : May 6, 1980
INVENTOR(S) : A. M. Patel

It is certified that error appears in the above-identified patent and that said Letters Patent are hereby corrected as shown below:

Column 15, line 10, "$Sd_{m+j}{}^a = Sd_{m+15-j}{}^b = Sv_m{}^a$" should read --$Sd_{m+j}{}^a = Sd_{m+15-j}{}^b = Sv_m{}^a$--.

Column 15, line 35, "i=j-(n-m" should read --i=j-(n-m)--.

Column 15, line 63, "$e_m{}^a(j) = Sd_{m=j}{}^a$" should read --$e_m{}^a(j) = Sd_{m+j}{}^a$--.

Column 25, line 35, "pointer" should read --pointers--.

Signed and Sealed this

*Second* Day of *September 198*

[SEAL]

Attest:

SIDNEY A. DIAMOND

*Attesting Officer*

*Commissioner of Patents and Trademarl*